(12) United States Patent
Shimizu et al.

(10) Patent No.: US 9,157,544 B2
(45) Date of Patent: Oct. 13, 2015

(54) SOLENOID VALVE

(75) Inventors: Tetsuya Shimizu, Anjo (JP); Kazuhiko Kato, Anjo (JP); Naoyuki Fukaya, Okazaki (JP); Kazunori Ishikawa, Toyota (JP); Kenichi Tsuchida, Anjo (JP); Akitomo Suzuki, Anjo (JP); Noriomi Fujii, Anjo (JP)

(73) Assignee: AISIN AW CO., LTD., Anjo (JP)

( * ) Notice: Subject to any disclaimer, the term of this patent is extended or adjusted under 35 U.S.C. 154(b) by 1320 days.

(21) Appl. No.: 12/453,880

(22) Filed: May 26, 2009

(65) Prior Publication Data

US 2009/0301588 A1 Dec. 10, 2009

(30) Foreign Application Priority Data

| May 29, 2008 | (JP) | 2008-141148 |
| Jul. 10, 2008 | (JP) | 2008-179928 |
| Mar. 23, 2009 | (JP) | 2009-070666 |

(51) Int. Cl.

| F15B 13/043 | (2006.01) |
| F16K 31/06 | (2006.01) |
| F16H 61/00 | (2006.01) |
| F16H 61/02 | (2006.01) |
| F16K 11/07 | (2006.01) |
| F04B 17/04 | (2006.01) |
| F04B 53/10 | (2006.01) |
| F16D 48/02 | (2006.01) |

(52) U.S. Cl.
CPC ........... *F16K 31/0613* (2013.01); *F04B 17/042* (2013.01); *F04B 53/10* (2013.01); *F16H 61/0021* (2013.01); *F16H 61/0251* (2013.01); *F16K 11/0716* (2013.01); *F16K 31/0693* (2013.01); *F16D 2048/0221* (2013.01); *F16H 2061/0253* (2013.01); *Y10T 137/8671* (2015.04); *Y10T 137/86614* (2015.04)

(58) Field of Classification Search
CPC ............ F16K 31/0613; F16K 31/0693; F16K 11/0716; F04B 17/042; F04B 53/10; F16H 61/0251; F16H 61/0021; F16H 2061/0253; Y10T 137/8671; Y10T 137/86614; F16D 2048/0221
USPC ............... 137/625.65, 625.5, 625.64, 625.69; 251/129.15
See application file for complete search history.

(56) References Cited

U.S. PATENT DOCUMENTS

| 4,021,152 A | * | 5/1977 | Toyoda | 264/209.1 |
| 2005/0202917 A1 | * | 9/2005 | Shimizu et al. | 475/120 |
| 2006/0172856 A1 | * | 8/2006 | Takagi | 477/127 |

FOREIGN PATENT DOCUMENTS

| DE | 101 58 434 A1 | 6/2002 |
| JP | Y2-1-18417 | 5/1989 |
| JP | A-2000-179506 | 6/2000 |
| JP | A-2000-313252 | 11/2000 |

(Continued)

OTHER PUBLICATIONS

Mar. 2, 2015 European Search Report issued in European Application No. 09754684.0.

*Primary Examiner* — Len Tran
*Assistant Examiner* — Joel Zhou
(74) *Attorney, Agent, or Firm* — Oliff PLC

(57) ABSTRACT

A valve section that functions as a solenoid valve device that includes a pressure adjusting section that adjusts fluid pressure supplied from a fluid pressure source; a pump section that sucks and discharges working fluid in a reservoir; and a single solenoid section that drives the pressure adjusting section and the pump section.

16 Claims, 17 Drawing Sheets

(56) References Cited

FOREIGN PATENT DOCUMENTS

| JP | A-2002-168330 | 6/2002 | |
| JP | A-2004-176895 | 6/2004 | |
| JP | A-2007-126974 | 5/2007 | |
| JP | 2008180303 | * 7/2008 | F16H 61/00 |
| JP | A-2008-180303 | 8/2008 | |

* cited by examiner

SOLENOID PUMP ON

SOLENOID PUMP OFF

FIG.5

|  |  | C1 | C2 | C3 | B1 | B2 | B3 | B4 | F1 | F2 | F3 |
|---|---|---|---|---|---|---|---|---|---|---|---|
|  | P |  |  |  |  |  |  |  |  |  |  |
|  | R |  |  | ○ | (○) |  | ○ | ○ |  |  |  |
|  | N |  |  |  |  |  |  |  |  |  |  |
| D | 1st | ○ |  |  |  |  | (○) |  |  |  | ○ |
| D | 2nd | ○ |  |  |  | (○) | ○ |  | ○ | ○ |  |
| D | 3rd | ○ |  | ○ | (○) |  | ● |  | ○ |  |  |
| D | 4th | ○ | ○ | ● |  |  | ● |  |  |  |  |
| D | 5th |  | ○ | ○ | ○ |  | ● |  |  |  |  |

(○) ENGINE BRAKE IN OPERATION
(●) ENGAGED BUT NO TORQUE TRANSMITTED

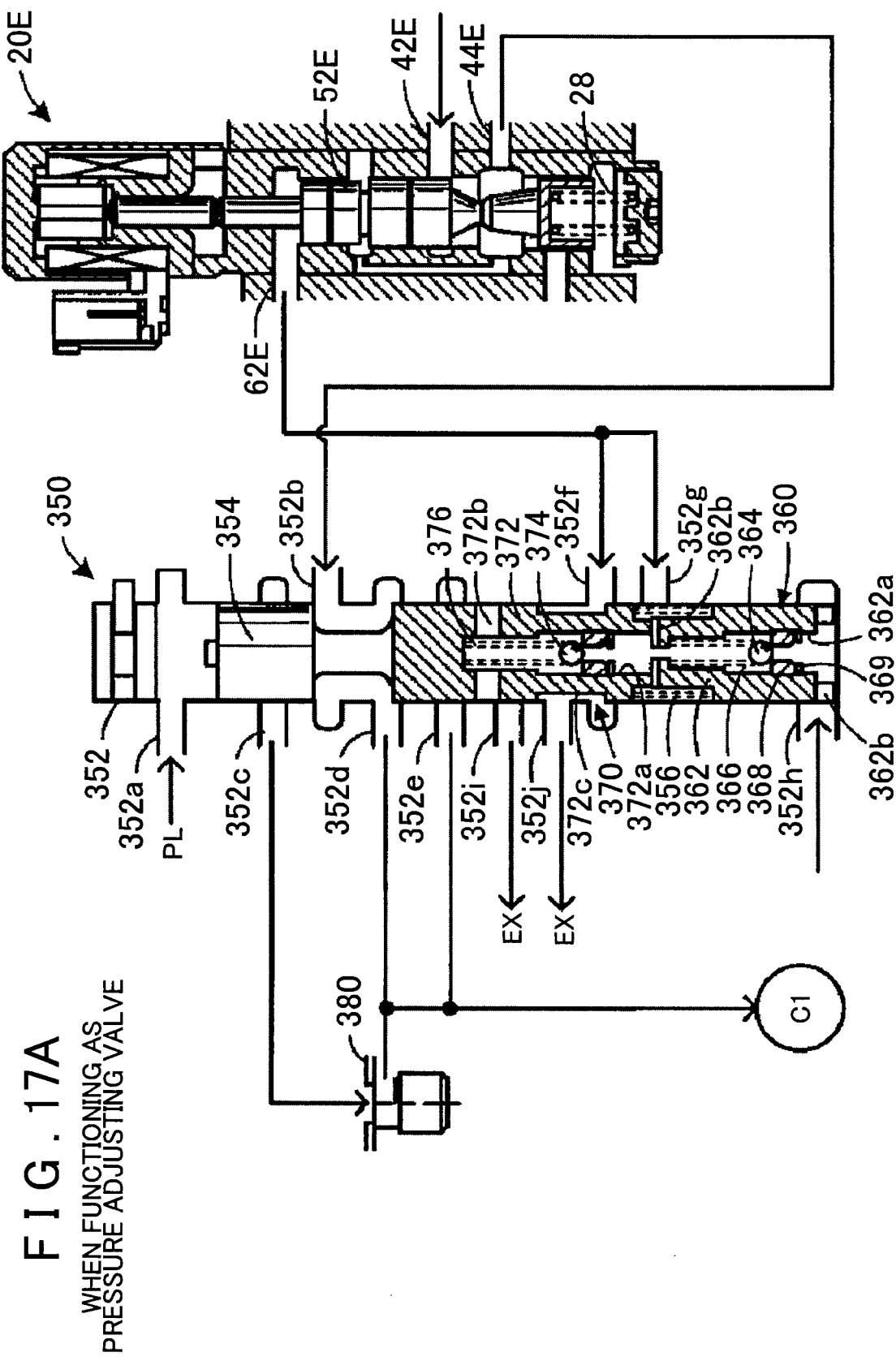

WHEN FUNCTIONING AS PUMP

SOLENOID VALVE

INCORPORATION BY REFERENCE

The disclosure of Japanese Patent Applications No. 2008-141148 filed on May 29, 2008, No. 2008-179928 filed on Jul. 10, 2008, and No. 2009-070666 filed on Mar. 23, 2009, including the specification, drawings and abstract are incorporated herein by reference in its entirety.

BACKGROUND

The present invention relates to a solenoid valve device.

As a solenoid valve of this type in related art, there is one proposed that includes a sleeve having a cylindrical valve chamber formed therein with various ports of an input port, an output port, a drain port, and a feedback port for introducing and draining hydraulic oil, a spool that is a shaft-like member inserted into the valve chamber and includes a plurality of cylindrical lands having an outer diameter of about the same size as the inner diameter of the valve chamber and a cylindrical communicating portion that has an outer diameter smaller than the outer diameter of the lands and communicates between the ports, and a solenoid for moving the spool in an axial direction (for example, refer to Japanese Patent Application Publication No. JP-A-2004-176895).

Further, there is also proposed a solenoid pump which pumps fluid by repeating excitation and de-excitation of an electromagnetic coil (for example, refer to Japanese Patent Application Publication No. JP-A-2007-126974). This solenoid pump is provided with a spring member assembled for bouncing back a piston that forms a pump chamber by the bounce force of the spring member and disposed with an electromagnetic coil for generating attractive force in an opposite direction to the bouncing force of the spring member. De-excitation (switching off) of the electromagnetic coil moves the piston by the bouncing force of the spring member to suck fluid, and excitation (switching on) of the electromagnetic coil moves the piston by the attractive force of the electromagnetic coil to discharge the fluid sucked.

SUMMARY

In a device combined with a pump other than a solenoid valve, for example, a device in which a hydraulic circuit for activating clutches (brakes) of a vehicle automatic transmission on and off is combined with a solenoid valve (linear solenoid) for adjusting clutch pressure and a pump for generating fluid pressure, the space for mounting the device may be limited, and therefore miniaturization of device is required as much as possible.

It is a main object of the present invention to achieve miniaturization of a solenoid valve device as a whole, combining the function as a pump.

In order to achieve the aforementioned main object, the solenoid valve device of the present invention has adapted the following means.

A solenoid valve device according to a first aspect of the present invention includes: a pressure adjusting section that adjusts fluid pressure supplied from a fluid pressure source; a pump section that sucks and discharging working fluid in a reservoir; and a single solenoid section that drives the pressure adjusting section and the pump section.

In the solenoid valve device according to the first aspect of the present invention, the pressure adjusting section that adjusts the fluid pressure supplied from the fluid pressure source and the pump section that sucks and discharging the working fluid in the reservoir are driven by the single solenoid section. Accordingly, comparing to the case where a pressure adjusting valve and a solenoid pump are separately provided, the device as a whole can be miniaturized.

The solenoid valve device according to the first aspect of the present invention may further include a valve element. In the solenoid valve device, the pressure adjusting section is operated by electromagnetic force of the solenoid section, and the valve element selectively operates to compress and expand a pump chamber in the pump section and to adjust fluid pressure supplied from the fluid pressure source.

In the solenoid valve device according to an aspect of the present invention, the pressure adjusting section may include an elastic member that generates a thrust force in a direction opposite to a sliding direction of the valve element when driven by a thrust force of the solenoid section and an elastic member chamber that houses the elastic member. In the solenoid valve device, the elastic member chamber is commonly used as at least a part of the pump chamber. Here, the "elastic member" includes a spring. In the solenoid valve device according to the first aspect of the present invention, the working fluid may be sucked as the valve element slides by an elastic force of the elastic member when the thrust force of the solenoid section is released, and the working fluid sucked may be discharged as the valve element slides by the thrust force generated by the solenoid section. In the solenoid valve device according to the first aspect of the present invention, the pressure adjusting section may have a feedback port and be structured as a normal-closed type solenoid valve that is closed when the solenoid section is not being energized. Consequently, as the load of the elastic member (spring) can be reduced comparing to a normal-open type solenoid valve which is opened when the solenoid section is being energized, the thrust force required for the solenoid section when functioning as a pump can be reduced, thereby achieving miniaturization of the solenoid section. This is based on that the feedback pressure in a normal-closed type solenoid valve acts in the same direction as the thrust force of the solenoid section, while the feedback pressure in a normal-open type solenoid valve acts in an opposite direction to the thrust force of the solenoid section.

Further, in the solenoid valve device according to the first aspect of the present invention, the pump section may be provided with a suction/discharge mechanism that sucks the working fluid from the reservoir and discharges the working fluid sucked to an operation target.

In the solenoid valve device according to an aspect of the present invention in which the solenoid valve device is provided with the suction/discharge mechanism, the suction/discharge mechanism may be structured with a suction check valve that allows the working fluid to flow from the reservoir to the pump chamber in the pump section and a discharge check valve that allows the working fluid to flow from the pump chamber to the operation target. In the solenoid valve device according to the first aspect of the present invention, the suction check valve may be closed when inside the pump chamber is under a positive pressure and opened when inside the pump chamber is under a negative pressure, and the discharge check valve may be closed when inside the pump chamber is under a negative pressure and opened when inside the pump chamber is under a positive pressure.

The solenoid valve device according to an aspect of the present invention in which the pressure adjusting section is provided with the valve element, the elastic member, and the elastic member chamber may further include a suction check valve that allows the working fluid to flow from the reservoir to the pump chamber in the pump section and a discharge check valve that allows the working fluid to flow from the pump chamber to the operation target, and in the solenoid valve device, the suction check valve and the discharge check valve may be disposed external to the pressure adjusting section, or the suction check valve may be built into the pressure adjusting section. In the latter case, as the suction check valve which is considered to greatly contribute to volumetric efficiency can be structured in relatively high precision, the volumetric efficiency can be improved. Further, in the latter case, the discharge check valve may be built into the pressure adjusting section. As a consequence, the volumetric efficiency can further be improved.

Further, the solenoid valve device according to the first aspect of the present invention may further include a switching device that switches between a first state in which the working fluid in the pump chamber in the pump section is drained and a second state in which the working fluid in the pump chamber is inhibited to be drained. In the solenoid valve device according to the first aspect of the present invention, the switching device may have a spool being slidable in a hollow portion connected to the pump chamber through a flow passage, and may be a switching valve forming the first state when the spool is at a first position and forming the second state when the spool is at a second position. In the solenoid valve device according to the first aspect of the present invention, the pump section may be built in the pressure adjusting section, the pressure adjusting section may have a suction port, a discharge port, and a drain port that is connected to the hollow portion of the switching valve through the flow passage, and the working fluid may be sucked through the suction port and the working fluid sucked may be discharged through the discharge port.

Further, in the solenoid valve device according to the first aspect of the present invention, the pressure adjusting section may be provided with a hollow sleeve in which an input port and an output port are formed and a spool that forms a pressure adjusting chamber with the sleeve such that the fluid pressure input from the input port is adjusted and output to the output port by sliding inside the sleeve, and the pump chamber in the pump section may be formed as a space blocked from the pressure adjusting chamber. Consequently, the function as a pressure adjusting valve and the function as a pump can be provided for a single set of the sleeve and the spool, and therefore, the device can further be miniaturized.

The solenoid valve device incorporated in a drive unit that drives an automatic transmission provided with a plurality of fluid pressure servos for friction engagement elements according to the first aspect of the present invention may be structured to function as a pressure adjusting valve that adjusts fluid pressure acting on one of the plurality of fluid pressure servos for the friction engagement elements and to function as a solenoid pump that generates fluid pressure acting on the other one of the plurality of fluid pressure servos for the friction engagement elements, or may be structured to function as a pressure adjusting valve that adjusts fluid pressure acting on one of the plurality of fluid pressure servos for the friction engagement elements and to function as a solenoid pump that generates fluid pressure acting on the one of the plurality of fluid pressure servos for the friction engagement elements. Here, the "friction engagement elements" include, in addition to a clutch for connecting two rotational systems, a brake for connecting a single rotation system to a fixing system, such as a case.

BRIEF DESCRIPTION OF THE DRAWINGS

FIG. 5 is an operating table of the automatic transmission 130;

FIGS. 17A and 17B are diagrams explaining the operation of a switching valve 350.

DETAILED DESCRIPTION OF EMBODIMENTS

Next, an embodiment of the present invention will be described with an embodiment of the present invention.

Figure 1:
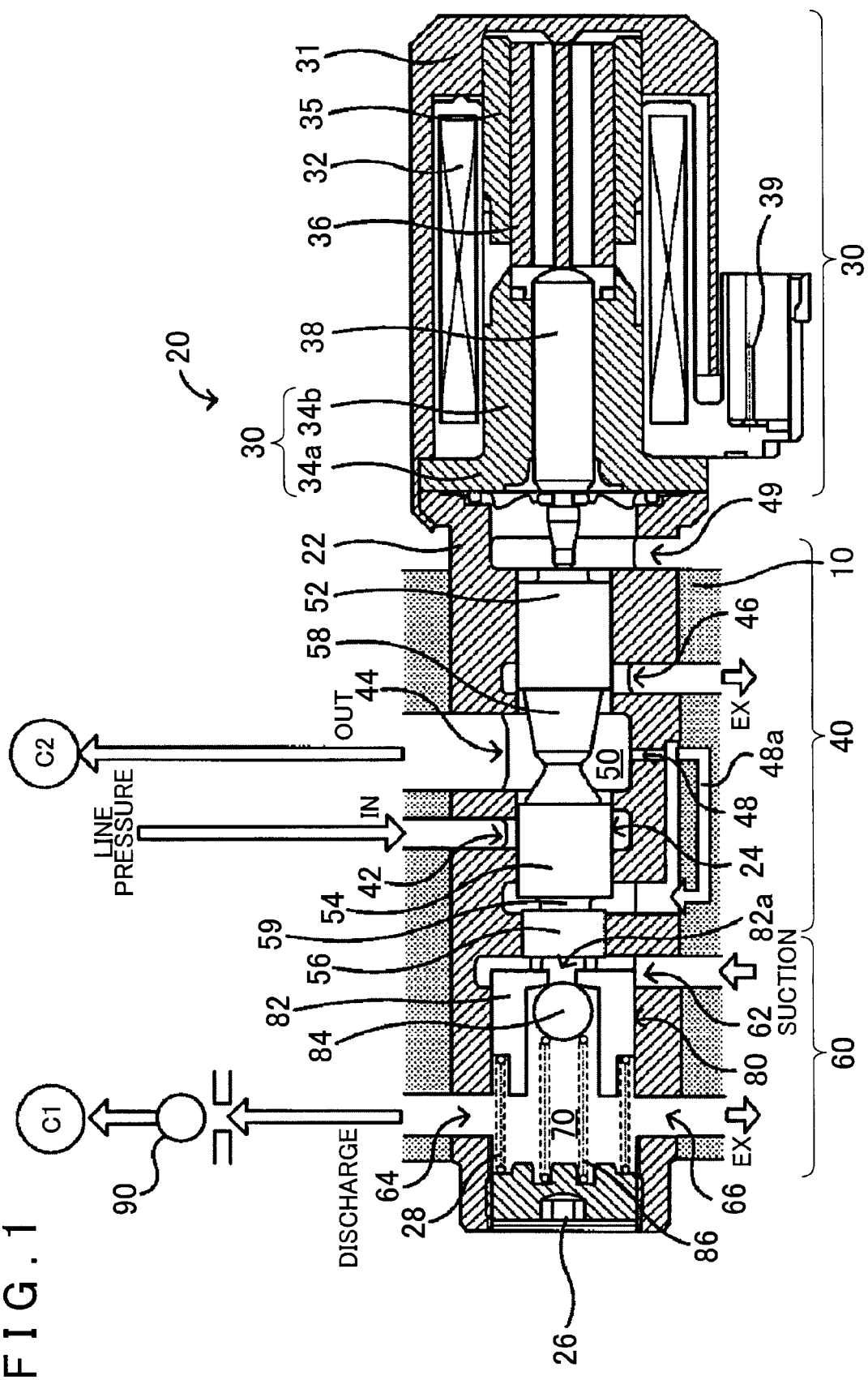
FIG. 1 is a schematic diagram showing the configuration of a solenoid valve 20 according to an embodiment of the present invention.
Figure 6:
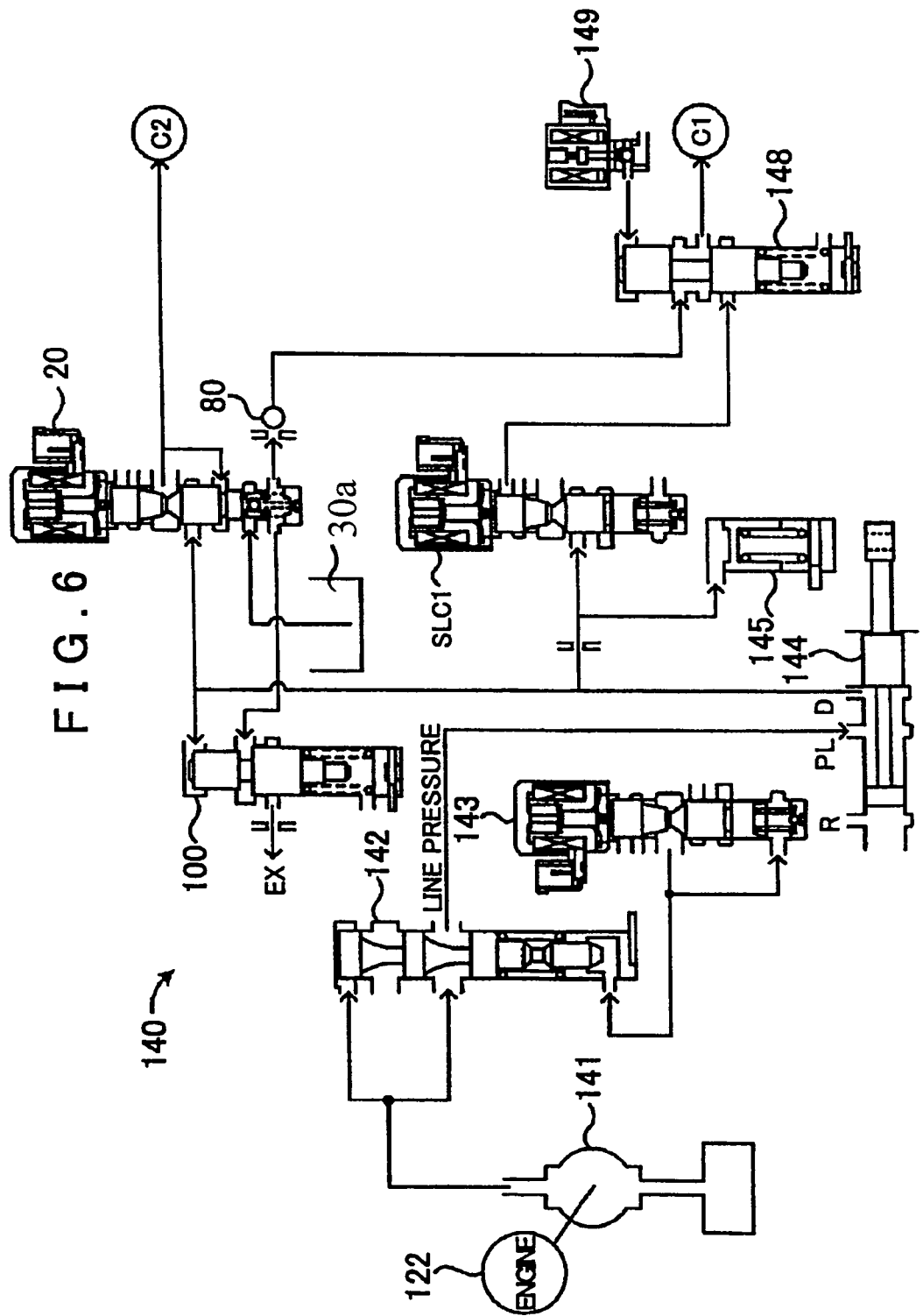
FIG. 6 is a schematic diagram showing the configuration of a hydraulic circuit 140.

FIG. 1 is a schematic diagram showing the configuration of a solenoid valve 20 according to the embodiment of the present invention. The solenoid valve 20 of the present embodiment is used, for example, for hydraulic control of clutches incorporated in an automatic transmission, and is structured to function as a linear solenoid valve for directly controlling the clutches by generating optimum clutch pressure from a line pressure and to function as a solenoid pump for generating hydraulic pressure. The solenoid valve 20 is provided with a solenoid section 30, a pressure adjusting valve section 40 driven by the solenoid section 30 for inputting the line pressure, adjusting the line pressure input, and outputting the adjusted line pressure, and a pump section 60 also driven by the solenoid section 30 for pumping hydraulic oil in a reservoir 30a (FIG. 6).

The solenoid section 30 is provided with: a case 31 as a cylindrical member having an open end and a closed bottom end; a coil (solenoid coil) 32 that is disposed on an inner periphery of the case 31 with an insulated electrical conductor wound around an insulating bobbin; a first core 34 composed of a flange portion 34a that has a flange outer peripheral portion fixed to the open end of the case 31 and a cylindrical portion 34b axially extending from the flange portion 34a along an inner peripheral surface of the coil 32; a cylindrical second core 35 that abuts an inner peripheral surface of a recessed portion formed at the bottom end of the case 31 and axially extending along the inner peripheral surface of the coil 32 to a position from which the cylindrical portion 34b of the first core 34 is separated by a predetermined gap; a plunger 36 that is inserted in the second core 35 and is axially slidable on inner peripheral surfaces of the first core 34 and the second core 35; and a shaft 38 that is inserted in the cylindrical portion 34b of the first core 34 abutting the tip of the plunger 36, and axially slidable on an inner peripheral surface of the cylindrical portion 34b. Further, in the solenoid section 30, terminals from the coil 32 are connected to a connector portion 39 formed on an outer peripheral portion of the case 31, and the coil 32 is energized through these terminals. The case 31, the first core 34, the second core 35, and the plunger 36 are all composed of a ferromagnetic material such as highly pure iron, and a space between an end face of the cylindrical portion 34b of the first core 34 and an end face of the second core 35 are formed to serve as a non-magnetic body. As this space is to serve as a non-magnetic body, a non-magnetic material such as stainless steel or brass may be provided.

In the solenoid section 30, when the coil 32 is energized, a magnetic circuit is formed such that magnetic flux flows around the coil 32 in the order of the case 31, the second core 35, the plunger 36, the first core 34, and the case 31. Consequently, an attractive force is acted on between the first core 34 and the plunger 36 to attract the plunger 36. As described above, since the tip of the plunger 36 abuts on the shaft 38 that is axially slidable on the inner peripheral surface of the first core 34, the shaft 38 is pushed forward (leftward in the drawing) as the plunger 36 is attracted.

The pressure adjusting valve section 40 and the pump section 60 are provided with, as common members thereof, a nearly cylindrical sleeve 22 that is incorporated in a valve body 10 and has one end attached to the first core 34 by the case 31 of the solenoid section 30, a spool 24 that is inserted in the internal space formed in the sleeve 22 and that has one end abutting on the tip of the shaft 38 of the solenoid section 30, an end plate 26 screwed onto the other end of the sleeve 22, and a spring 28 provided between the end plate 26 and the other end of the spool 24 for biasing the spool 24 towards the solenoid section 30.

The sleeve 22 is formed, as openings formed in a portion that constitutes the pressure adjusting valve section 40, with an input port 42 for inputting hydraulic oil, an output port 44 for discharging the hydraulic oil input to a clutch C2, a drain port 46 for draining the hydraulic oil input, and a feedback port 48 for causing a feedback force to be acted on the spool 24 by inputting the hydraulic oil output from the output port 44 through an oil passage 48a formed by the inner surface of the valve body 10 and the outer surface of the sleeve 22. Further, at the end of the sleeve 22 on the solenoid section 30 side, a drain hole 49 for draining the hydraulic oil leaked from between the inner peripheral surface of the sleeve 22 and the outer peripheral surface of the spool 24 as the spool 24 slides.

Figure 2A:
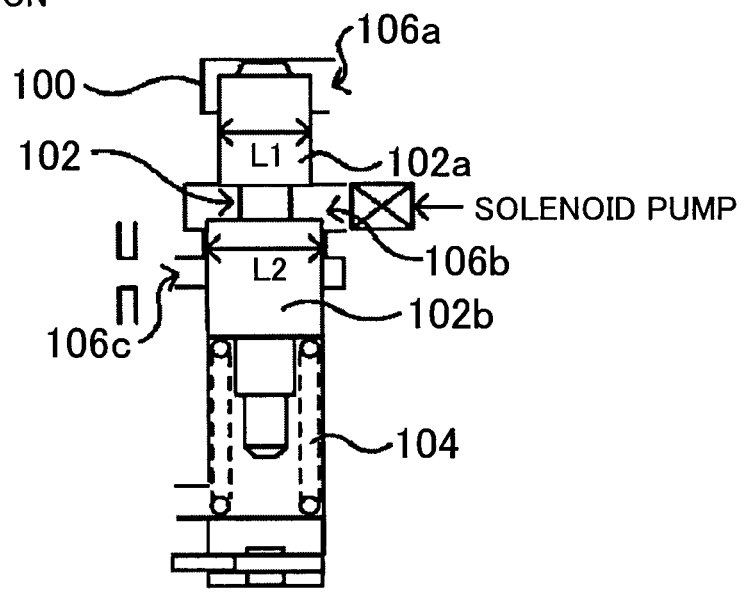
FIGS. 2A and 2B are schematic diagrams showing the configuration of a drain valve 100.
Figure 2B:
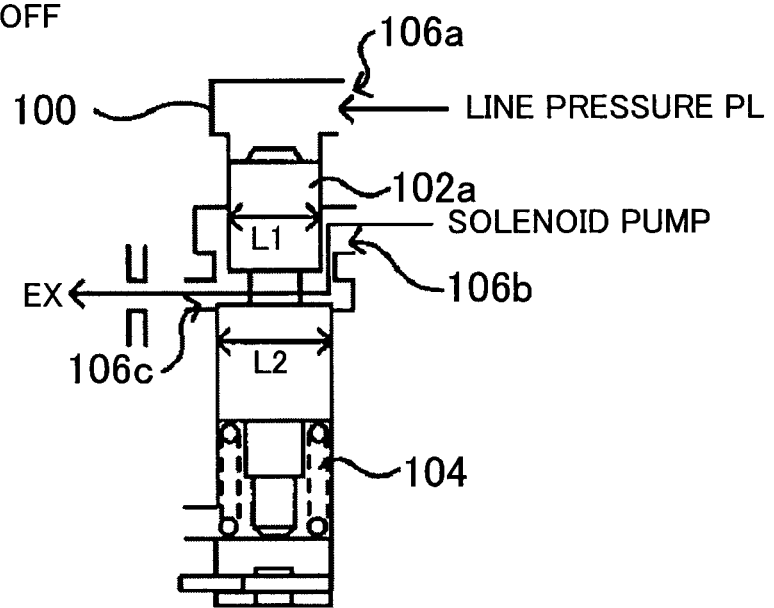

The sleeve 22 is formed, as openings formed in a portion that constitutes of the pump section 60, with a suction port 62 for sucking hydraulic oil, a discharging port 64 for discharging the hydraulic oil sucked, and a drain port 66 for draining the hydraulic oil remaining when the function of the pump section 60 is stopped. The drain port 66 is adapted to drain hydraulic oil through a drain valve 100. FIGS. 2A and 2B are schematic diagrams showing the configuration of the drain valve 100. The drain valve 100 is inserted, as shown in the drawing, with a spool 102. The spool 102 is disposed with an upper land 102a having an outer diameter of a value L1 at an upper portion of the spool 102 and a lower land 102b having an outer diameter of a value L2, which is larger than the value L1, at a lower portion of the spool 102. The drain valve 100 is provided with a spring 104 for biasing the spool 102 upward in the drawing at a lower end of the drain valve 100. There is also formed, sequentially from top to bottom of the drawing, a signal pressure port 106a for inputting line pressure PL as a signal pressure, an input port 106b communicating with the drain port 66 of the pump section 60, and an output port 106c for draining. In the drain valve 100, when the line pressure PL is off, the biasing force of the spring 104 moves the spool 102 upward in the drawing, blocking off the communication between the input port 106b and the output port 106c by the land 102b having the outer diameter of value L2 (refer to FIG. 2A). When the line pressure PL is acted on, the signal pressure overcomes the biasing force of the spring 104 and moves the spool 102 downward in the drawing, communicating the input port 106b with the output port 106c through a clearance of the land 102a having the outer diameter of the value L1, which is smaller than the value L2, to drain the remaining hydraulic oil (refer to FIG. 2B).

The spool 24 is formed as a shaft-like member to be inserted inside the sleeve 22, and is provided with: three cylindrical lands 52, 54 and 56 slidable on an inner wall of the sleeve 22; a communicating portion 58 that is formed to couple the land 52 with the land 54, has an outer diameter smaller than the outer diameters of the lands 52 and 54 in a tapered shape such that the outer diameter becomes smaller towards the center from each of the lands 52 and 54, and communicates between each of the input port 42, the output port 44, and the drain port 46; a coupling portion 59 that couples the land 54 with the land 56 having an outer diameter smaller than that of the land 54 and forms a feedback chamber together with the inner wall of the sleeve 22 for causing the feedback force to be acted on the spool 24 towards the solenoid section 30; and a suction check valve 80 connected to the land 56. The sleeve 22, the communicating portion 58 of the spool 24, and the lands 52 and 54 form a pressure adjusting chamber 50, and the sleeve 22, the suction check valve 80 of the spool 24, and the end plate 26 form a pump chamber 70.

The suction check valve 80 is provided with: a cylindrical body 82 that is coupled with the land 56 and formed with an opening 82a in the center thereof for communicating the pump chamber 70 with the suction port 62; a ball 84; and a spring 86 with the end plate 26 as a spring holder for urging the ball 84 to be pressed against the opening 82a of the body 82. The suction check valve 80 is closed by the biasing force of the spring 86 when inside the pump chamber 70 is under a positive pressure, and is opened when inside the pump chamber 70 is under a negative pressure.

Further, the valve body 10 is provided with a discharge check valve 90 that is a counterpart of the suction check valve 80, and the discharge check valve 90 is structured to be closed when inside the pump chamber 70 is under a negative pressure and to be opened when inside the pump chamber 70 is under a positive pressure.

The operation of the solenoid valve 20 of the present embodiment thus structured, particularly when functioning as a linear solenoid valve and as a solenoid pump, will be described. First, the operation when functioning as a linear solenoid valve will be described. Now, the coil 32 is not being energized. In this case, as the spool 24 is moved towards the solenoid section 30 by the biasing force of the spring 28, the input port 42 is blocked by the land 54, and the output port 44 and the drain port 46 are placed in communication with each other through the communicating portion 58. Accordingly, no hydraulic pressure is acted on the clutch C2. When the coil 32 is energized, the plunger 36 is attracted to the first core 34 by the attractive force corresponding to the amount of current applied to the coil 32 causing the shaft 38 to be pushed out and thus the spool 24 that abuts on the tip of the shaft 38 is moved towards the end plate 26. Consequently, the input port 42, the output port 44, and the drain port 46 are placed in communication with one another, and a part of the hydraulic oil input from the input port 42 is output to the output port 44 and the rest of the hydraulic oil is output to the drain port 46. Additionally, the hydraulic oil is supplied to the feedback chamber through the feedback port 48 and the feedback force corresponding to the output pressure of the output port 44 is act on the spool 24 towards the solenoid section 30. Accordingly, the spool 24 stops at the position where the thrust force (attractive force) of the plunger 36, the spring force of the spring 28, and the feedback force just balance out. In this case, the larger the amount of current applied to the coil 32, more specifically, the larger the thrust force of the plunger 36, the more the spool 24 moves towards the end plate 26, thereby expanding the opening area of the input port 42 and reducing the opening area of the drain port 46. When the energization of the coil 32 is maximized, the spool 24 is moved to the position that is closest to the end plate 26 within the range of movement of the plunger 36, and thus the input port 42 and the output port 44 are placed in communication with each other through the communicating portion 58 and the drain port 46 is blocked by the land 52, cutting off the communication of the output port 44 with the drain port 46. Consequently, the maximum hydraulic pressure is acted on the clutch C2. As described in the foregoing, in the solenoid valve 20 of the present embodiment, as the input port 42 is blocked and the output port 44 is placed in communication with the drain port 46 in the state where the coil 32 is de-energized, it is apparent that the solenoid valve 20 of the present embodiment functions as a normal-closed type solenoid valve.

Secondly, the operation of the solenoid valve 20 of the present embodiment when functioning as a solenoid pump will be described. Now, the coil 32 is just de-energized after being energized. In this case, as the spool 24 is moved from the end plate 26 side to the solenoid section 30 side, the pressure inside the pump chamber 70 becomes negative, thereby opening the suction check valve 80 and closing the discharge check valve 90 so that the hydraulic oil is sucked into the pump chamber 70 from the suction port 62 through the suction check valve 80. When the coil 32 is energized from this state, the spool 24 is moved from the solenoid section 30 side to the end plate 26 side, and therefore the pressure inside the pump chamber 70 becomes positive, thereby closing the suction check valve 80 and opening the discharge check valve 90 so that the hydraulic oil sucked in the pump chamber 70 is discharged from the discharge port 64 through the discharge check valve 90. Consequently, by repeatedly energizing and de-energizing the coil 32, the solenoid valve 20 of the present embodiment can be made to function as a solenoid pump for pumping hydraulic oil.

Figure 3:
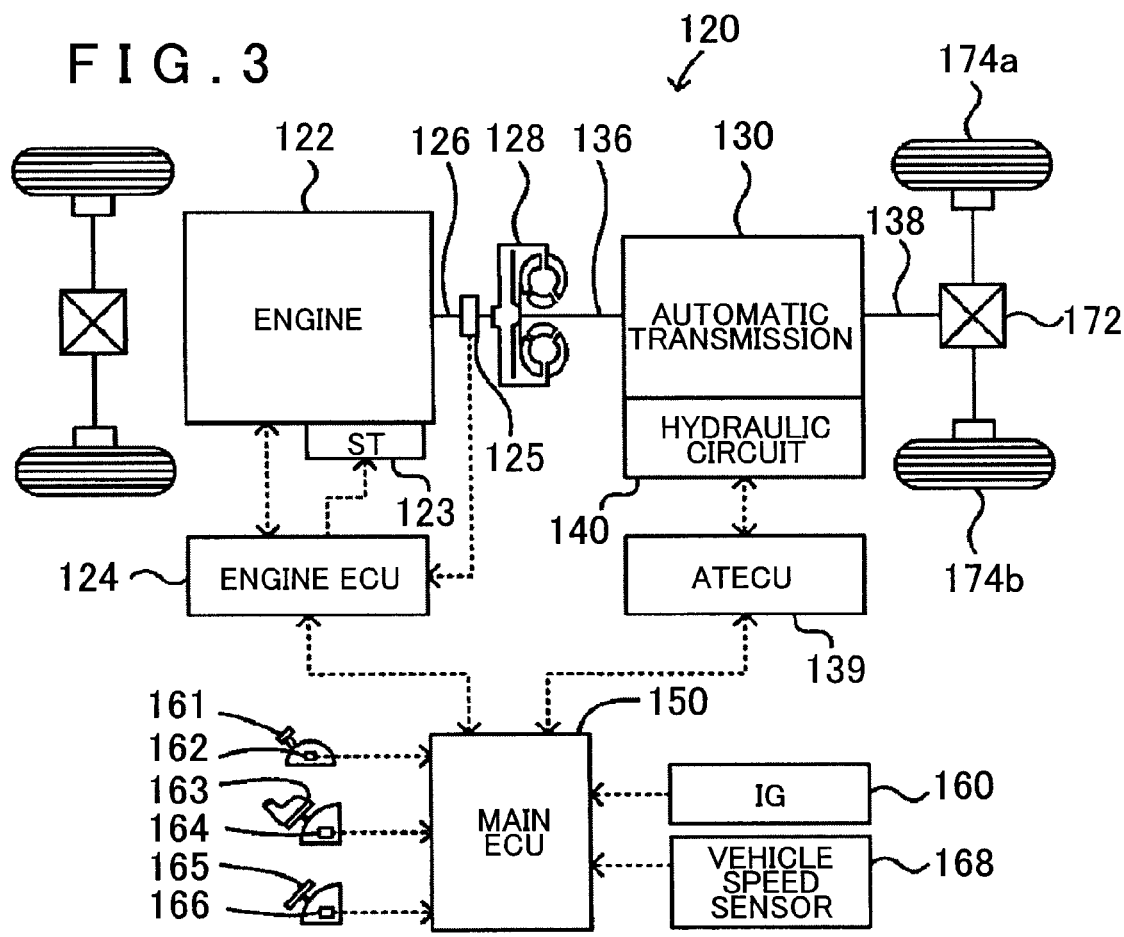
FIG. 3 is a schematic diagram showing the configuration of a motor vehicle 120 in which a drive unit for an automatic transmission is installed.
Figure 4:
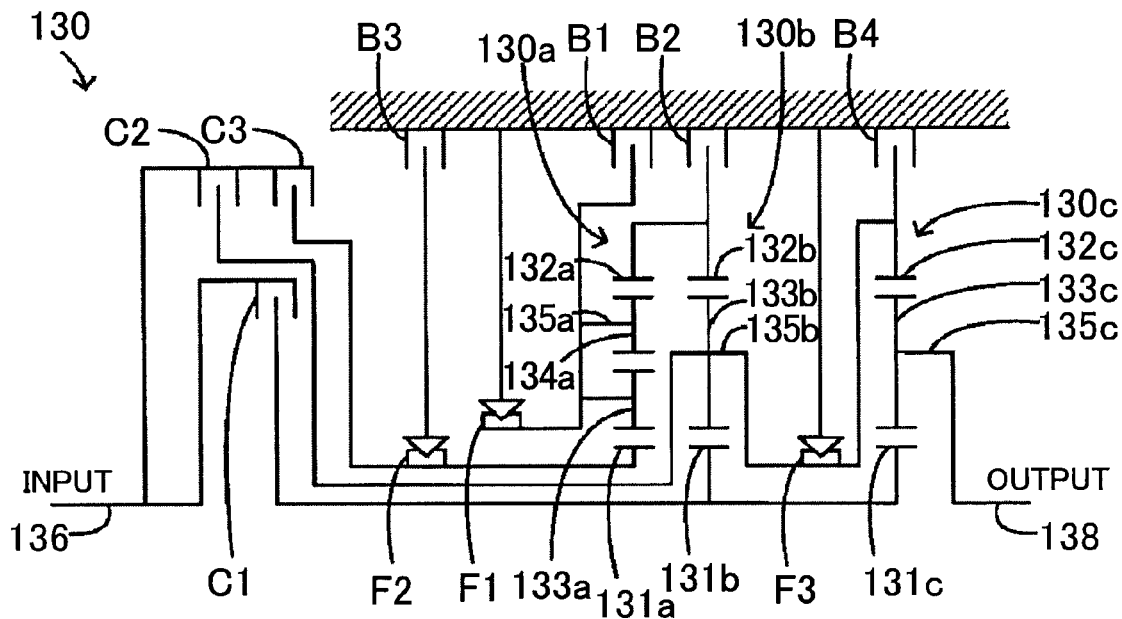
FIG. 4 is a schematic diagram showing the configuration of an automatic transmission 130.

Next, the configuration in which the solenoid valve 20 thus structured is incorporated in a drive unit of an automatic transmission installed in a motor vehicle will be described. FIG. 3 is a schematic diagram showing the configuration of a motor vehicle 120 in which a drive unit of an automatic transmission is installed, FIG. 4 is a schematic diagram showing the configuration of an automatic transmission 130. FIG. 5 is an operation table of the automatic transmission 130, and FIG. 6 is a schematic diagram showing the configuration of a hydraulic circuit 140. As shown in FIG. 3, the motor vehicle 120 is provided with: an engine 122 as an internal combustion engine; a starter motor 123 for cranking the engine 122 to start up; an automatic transmission 130 in which an input shaft 136 is coupled with a crank shaft 126 of the engine 122 via a torque converter 128 and an output shaft 138 is coupled with driving wheels 174a and 174b via a differential gear 172 so as to transmit power input from the input shaft 136 to the output shaft 138; a hydraulic circuit 140 serving as an actuator for driving the automatic transmission 130; and a main electronic control unit (hereinafter referred to as main ECU) 150 for controlling the whole motor vehicle.

The operation of the engine 122 is controlled by an engine electronic control unit (hereinafter referred to as engine ECU) 124. The engine ECU 124 is structured, although not shown in details, as a microprocessor centering on a CPU, and is provided with, other than the CPU, a ROM for storing processing programs, a RAM for temporarily storing data, an I/O port, and a communication port. The engine ECU 124 is fed with signals required for controlling the operation of the engine 122 from various sensors such as a rotation sensor 125 installed on the crank shaft 126 via the input port. The engine ECU 124 outputs a drive signal to a throttle motor for adjusting throttle openings, a control signal to a fuel injection valve, an ignition signal to spark plugs, a drive signal to the starter motor 123 and the like via the output port. The engine ECU 124 communicates with the main ECU 150 to control the engine 122 based on the control signal from the main ECU 150 and to output data relating to operating condition of the engine 122 to the main ECU 150 as required.

The automatic transmission 130 is provided, as shown in FIG. 4, with a planetary gear mechanism 130a of a double pinion type, two sets of planetary gear mechanisms 130b and 130c of a single pinion type, three sets of clutches C1, C2 and C3, four sets of brakes B1, B2, B3 and B4, and three sets of one-way clutches F1, F2 and F3. The double pinion type planetary gear mechanism 130a is provided with: a sun gear 131a as an external gear; a ring gear 132a as an internal gear concentrically disposed with the sun gear 131a; a plurality of first pinion gears 133a meshing with the sun gear 131a; a plurality of second pinion gears 134a meshing with the first pinion gears 133a and the ring gear 132a; and a carrier 135a for coupling the plurality of first pinion gears 133a and the plurality of second pinion gears 134a with one another and holding the first pinion gears 133a and the second pinion gears 134a in a rotatable and revolvable manner. The sun gear 131a is coupled with the input shaft 136 via the clutch C3, and is adapted to rotate freely or is restricted to rotate in one direction by switching the brake B3, which is coupled via the one-way clutch F2, on and off. The ring gear 132a is adapted to rotate freely or be fixed by switching the brake B2 on and off. The carrier 135a is adapted to rotate in one direction restricted by the one-way clutch F1 and to rotate freely or be fixed by switching the brake B1 on and off. The single pinion type planetary gear mechanism 130b is provided with a sun gear 131b as an external gear, a ring gear 132b as an internal gear concentrically disposed with the sun gear 131b, a plurality of pinion gears 133b meshing with the sun gear 131b and the ring gear 132b, and a carrier 135b holding the plurality of pinion gears 133b in a rotatable and revolvable manner. The sun gear 131b is coupled with the input shaft 136 via the clutch C1. The ring gear 132b is coupled with the ring gear 132a of the double pinion type planetary gear mechanism 130a and is adapted to rotate freely or be fixed by switching the brake B2 on and off. The carrier 135b is coupled with the input shaft 136 via the clutch C2 and is adapted to rotate in one direction restricted by the one-way clutch F3. Further, the single pinion type planetary gear mechanism 130c is provided with: a sun gear 131c as an external gear; a ring gear 132c as an internal gear concentrically disposed with the sun gear 131c; a plurality of pinion gears 133c meshing with the sun gear 131*c* and the ring gear 132*c*, and a carrier 135*c* holding the plurality of pinion gears 133*c* in a rotatable and revolvable manner. The sun gear 131*c* is coupled with the sun gear 131*b* of the single pinion type planetary gear mechanism 130*b*. The ring gear 132*c* is coupled with the carrier 135*b* of the single pinion type planetary gear mechanism 130*b* and is adapted to rotate freely or be fixed by switching the brake B4 on and off. The carrier 135*c* is coupled with the output shaft 138.

The automatic transmission 130 is adapted, as shown in FIG. 5, to switch among first to fifth forward speeds, a reverse speed and neutral by switching the clutches C1 to C3 on and off, and switching the brakes B1 to B4 on and off. The first forward speed stage, more specifically, the state where the rotation of the input shaft 136 is transmitted to the output shaft 138 at a speed reduced by the largest reduction ratio, can be established by switching on the clutch C1 and switching off the clutches C2 and C3 and the brakes B1 to B4. In this state, as the ring gear 132*c* of the single pinion type planetary gear mechanism 130*c* is fixed to rotate in one direction by the one-way clutch F3, the power input from the input shaft 136 to the sun gear 131*c* via the clutch C1 is output to the carrier 135*c*, i.e., the output shaft 138, at a speed reduced by the large reduction ratio. In the first speed stage, when an engine brake is in operation, by switching on the brake B4 in place of the one-way clutch F3, the rotation of the ring gear 132*c* is fixed. The second forward speed stage can be established by switching on the clutch C1 and the brake B3 and switching off the clutches C2 and C3 and the brakes B1, B2 and B4. In this state, as the sun gear 131*a* of the double pinion type planetary gear mechanism 130*a* is fixed to rotate in one direction by the one-way clutch F2 and the carrier 135*a* is fixed to rotate in one direction by the one-way clutch F1, the ring gear 132*a* and the ring gear 132*b* of the single pinion type planetary gear mechanism 130*b* are also fixed to rotate in one direction and the power input from the input shaft 136 to the sun gear 131*b* via the clutch C1 is output to the carrier 135*b* and the ring gear 132*c* of the single pinion type planetary gear mechanism 130*c* at a speed reduced by the ring gear 132*b* that is fixed. The power input from the input shaft 136 to the sun gear 131*c* via the clutch C1 is output to the carrier 135*c*, i.e., the output shaft 138 at a speed reduced by a slightly smaller reduction ratio than that of the first forward speed stage corresponding to the rotating condition of the ring gear 132*c*. In the second speed stage, when the engine brake is in operation, by switching on the brake B2 in place of the one-way clutch F1 and the one-way clutch F2, the rotations of the ring gear 132*a* and the ring gear 132*b* are fixed. The third forward speed stage is established by switching on the clutches C1 and C3 and the brake B3 and switching off the clutch C2 and the brakes B1, B2 and B4. In this state, as the carrier 135*a* of the double pinion type planetary gear mechanism 130*a* is fixed to rotate in one direction by the one-way clutch F1, the power input from the input shaft 136 to the sun gear 131*a* via the clutch C3 is output to the ring gear 132*a* and the ring gear 132*b* of the single pinion type planetary gear mechanism 130*b* at a reduced speed. The power input from the input shaft 136 to the sun gear 131*b* via the clutch C1 is output to the carrier 135*b* and the ring gear 132*c* of the single pinion type planetary gear mechanism 130*c* at a speed reduced corresponding to the rotating condition of the ring gear 132*b*. The power input from the input shaft 136 to the sun gear 131*c* via the clutch C1 is output to the carrier 135*c*, i.e., the output shaft 138 at a speed reduced by a slightly smaller reduction ratio than that of the second forward speed stage corresponding to the rotating condition of the ring gear 132*c*. In the third speed stage, when the engine brake is in operation, by switching on the brake B1 in place of the one-way clutch F1, the rotation of the carrier 135*a* is fixed. The fourth forward speed stage can be established by switching on the clutches C1 to C3 and the brake B3 and switching off the brakes B1, B2 and B4. In this state, as the input shaft 136 is connected to the sun gear 131*b* of the single pinion type planetary gear mechanism 130*b* and the sun gear 131*c* of the single pinion type planetary gear mechanism 130*c* via the clutch C1 and is connected to the carrier 135*b* and the ring gear 132*c* via the clutch C2, all the rotating elements of the single pinion type planetary gear mechanisms 130*b* and 130*c* rotate as a unit, and the input shaft 136 and the output shaft 138 are directly connected. Thus, the power input from the input shaft 136 is transmitted at a value of 1.0 reduction ratio. In the fifth forward speed stage, more specifically, the state where the rotation of the input shaft 136 is transmitted to the output shaft 138 at a speed reduced by the smallest reduction ratio (at an increased speed) can be established by switching on the clutches C2 and C3 and the brakes B1 and B3 and switching off the clutch C1 and the brakes B2 and B4. In this state, as the carrier 135*a* of the double pinion type planetary gear mechanism 130*a* is fixed to rotate in one direction by the one-way clutch F1, the power input from the input shaft 136 to the sun gear 131*a* via the clutch C3 is output to the ring gear 132*a* and the ring gear 132*b* of the single pinion type planetary gear mechanism 130*b* at a reduced speed. The power input from the input shaft 136 to the carrier 135*b* via the clutch C2 is output to the sun gear 131*b* and the sun gear 131*c* of the single pinion type planetary gear mechanism 130*c* at a speed increased corresponding to the rotating condition of the ring gear 132*b*. The power input from the input shaft 136 to the ring gear 132*c* via the clutch C2 is output to the carrier 135*c*, i.e., the output shaft 138 at a speed increased by the smallest reduction ratio corresponding to the rotating condition of the sun gear 131*c*.

Further, in the automatic transmission 130, the neutral state, more specifically, disengaging the input shaft 136 from the output shaft 138 can be carried out by switching off all the clutches C1 to C3 and the brakes B1 to B4. Furthermore, the reverse state can be established by switching on the clutch C3 and the brake B4 and switching off the clutches C1 and C2 and the brakes B1 to B3. In this state, as the carrier 135*a* of the double pinion type planetary gear mechanism 130*a* is fixed to rotate in one direction by the one-way clutch F1, the power input from the input shaft 136 to the sun gear 131*a* via the clutch C3 is output to the ring gear 132*a* and the ring gear 132*b* of the single pinion type planetary gear mechanism 130*b* at a reduced speed. As the rotations of the carrier 135*b* of the single pinion type planetary gear mechanism 130*b* and the ring gear 132*c* of the single pinion type planetary gear mechanism 130*c* are fixed by the brake B4, the power output to the ring gear 132*a* results in reverse rotation and is output to the carrier 135*c*, i.e., the output shaft 138. In the reverse state, when the engine brake is in operation, by switching on the brake B1 in place of the one-way clutch F1, the rotation of the carrier 135*a* is fixed.

As shown in FIG. 6, the hydraulic circuit 140 is structured with: a mechanical oil pump 141 for pumping oil by the power from the engine 122; a regulator valve 142 for adjusting the pressure of the oil (line pressure PL) pumped from the mechanical oil pump 141; a linear solenoid 143 for driving the regulator valve 142; a linear solenoid valve (hereinafter referred to as linear solenoid) SLC1 for inputting the line pressure PL through a manual valve 144, adjusting the line pressure PL input, and outputting the adjusted line pressure PL to the clutch C1; an accumulator 145 for accumulating the line pressure PL supplied to the linear solenoid SLC1; the solenoid valve 20 of the present embodiment as described in the foregoing which serves as a linear solenoid valve for inputting the line pressure PL through the manual valve 144, adjusting the line pressure PL input, and outputting the adjusted line pressure PL to the clutch C2, and also serves as a solenoid pump while suspending the function as the linear solenoid valve; a switching valve 148 for selectively switching the connections of the flow passage formed between the linear solenoid SLC1 and the clutch C1 and the flow passage formed between the solenoid pump of the solenoid valve 20 and the clutch C1; an on/off solenoid 149 for driving the switching valve 148; and a drain valve 100 for draining hydraulic oil in the pump chamber 70 when suspending the function of the solenoid valve 20 of the present embodiment as a solenoid pump. In FIG. 6, the hydraulic system for the clutches C1 and C2 are shown. However, the hydraulic systems for, other than the clutches C1 and C2, the clutch C3 and the brakes B1 to B4 may also be similarly structured using the linear solenoid valves.

Figure 7A:
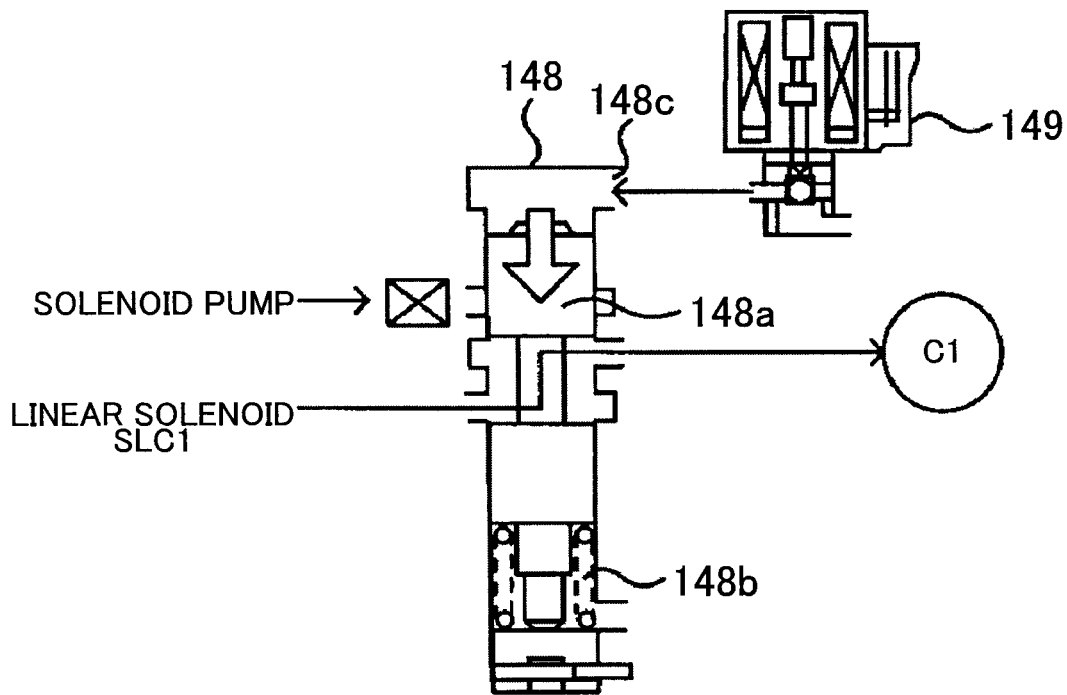
FIGS. 7A and 7B are diagrams explaining the operation of a switching valve 148.
Figure 7B:
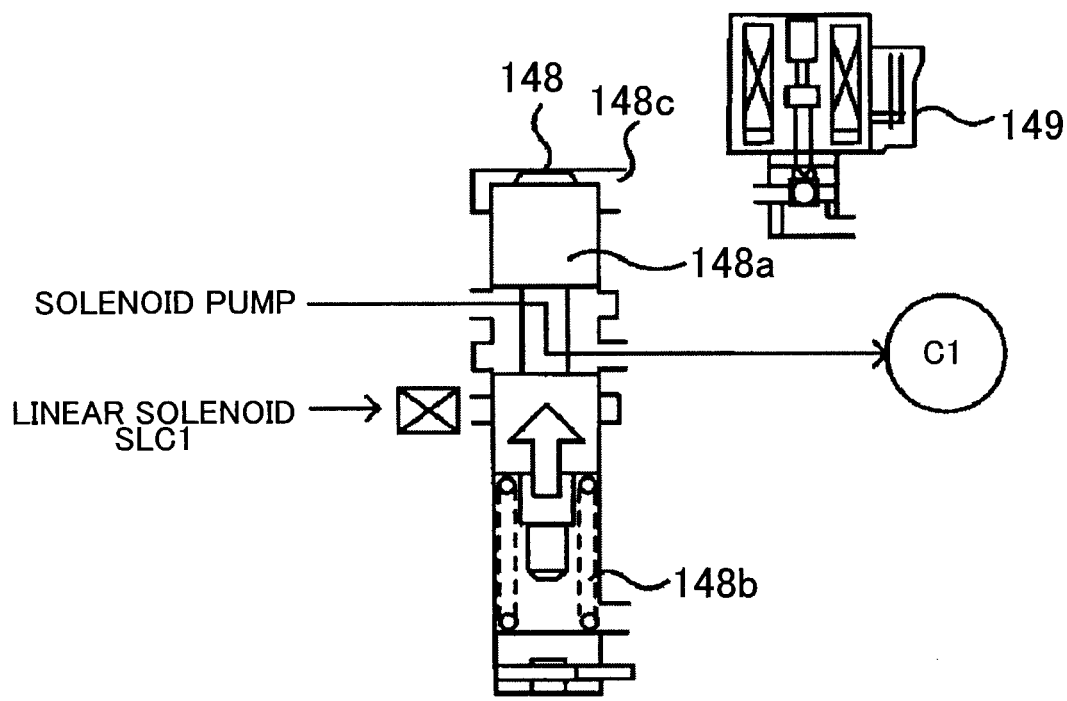

The switching valve 148, as shown in operational schematic diagrams in FIGS. 7A and 7B, is provided with a spring 148b for biasing a spool 148a upward in the drawing at the lower portion of the switching valve 148, and an input port 148c for inputting the signal pressure from the on/off solenoid 149 at the upper portion of the switching valve 148. When the signal pressure is input from the on/off solenoid 149, the signal pressure overcomes the biasing force of the spring 148b and thus the spool 148a is moved downward in the drawing, blocking the flow passage formed between the pump section 60 of the solenoid valve 20 and the clutch C1 and connecting the flow passage formed between the linear solenoid SLC1 and the clutch C1 (refer to FIG. 7A). When the signal pressure is not input from the on/off solenoid 149, the spool 148a is moved upward in the drawing by the biasing force of the spring 148b, connecting the flow passage formed between the pump section 60 of the solenoid valve 20 and the clutch C1 and blocking the flow passage formed between the linear solenoid SLC1 and the clutch C1 (refer to FIG. 7B).

The hydraulic circuit 140 is drive controlled by an automatic transmission electronic control unit (hereinafter referred to as ATECU) 139. The ATECU 139 is structured, although not shown in details, as a microprocessor centering on a CPU and is provided with, other than the CPU, a ROM for storing processing programs, a RAM for temporarily storing data, an I/O port, and a communication port. The ATECU 139 outputs drive signals to the linear solenoid 143, the linear solenoid SLC1, the solenoid valve 20 of the present embodiment, and the on/off solenoid 149 via the output port. The ATECU 139 communicates with the main ECU 150 to control the automatic transmission 130 (hydraulic circuit 140) based on the control signal from the main ECU 150 and to output the data relating to status of the automatic transmission 130 to the main ECU 150 as required.

The main ECU 150 is structured, although not shown in details, as a microprocessor centering on a CPU, and is provided with, other than the CPU, a ROM for storing processing programs, a RAM for temporarily storing data, an I/O port, and a communication port. The main ECU 150 is fed with an ignition signal from an ignition switch 160, a shift position SP from a shift position sensor 162 which detects an operating position of a shift lever 161, an accelerator opening Acc from an accelerator pedal position sensor 164 which detects the amount of depression of an accelerator pedal 163, a brake switch signal BSW from a brake switch 166 which detects the depression of a brake pedal 165, and a vehicle speed V from a vehicle speed sensor 168 via the input port. The main ECU 150 is connected with the engine ECU 124 and the ATECU 139 via the communication port to exchange various control signals and data to and from the engine ECU 124 and the ATECU 139.

In the motor vehicle 120 of the present embodiment thus structured, while running with the shift lever 161 at its driving position of D (drive) after the engine 122 is started up, when all the conditions predetermined for an auto-stop operation, such as the conditions in which the value of the vehicle speed V is 0, the accelerator pedal is off, the brake switch signal BSW is on, are met, the engine 122 is automatically stopped. After the engine 122 is automatically stopped, when conditions predetermined for an auto-start operation, such as the condition in which the brake switch signal BSW is off and the accelerator pedal is on, are subsequently met, the engine 122 that has been automatically stopped is automatically started.

Figure 8:
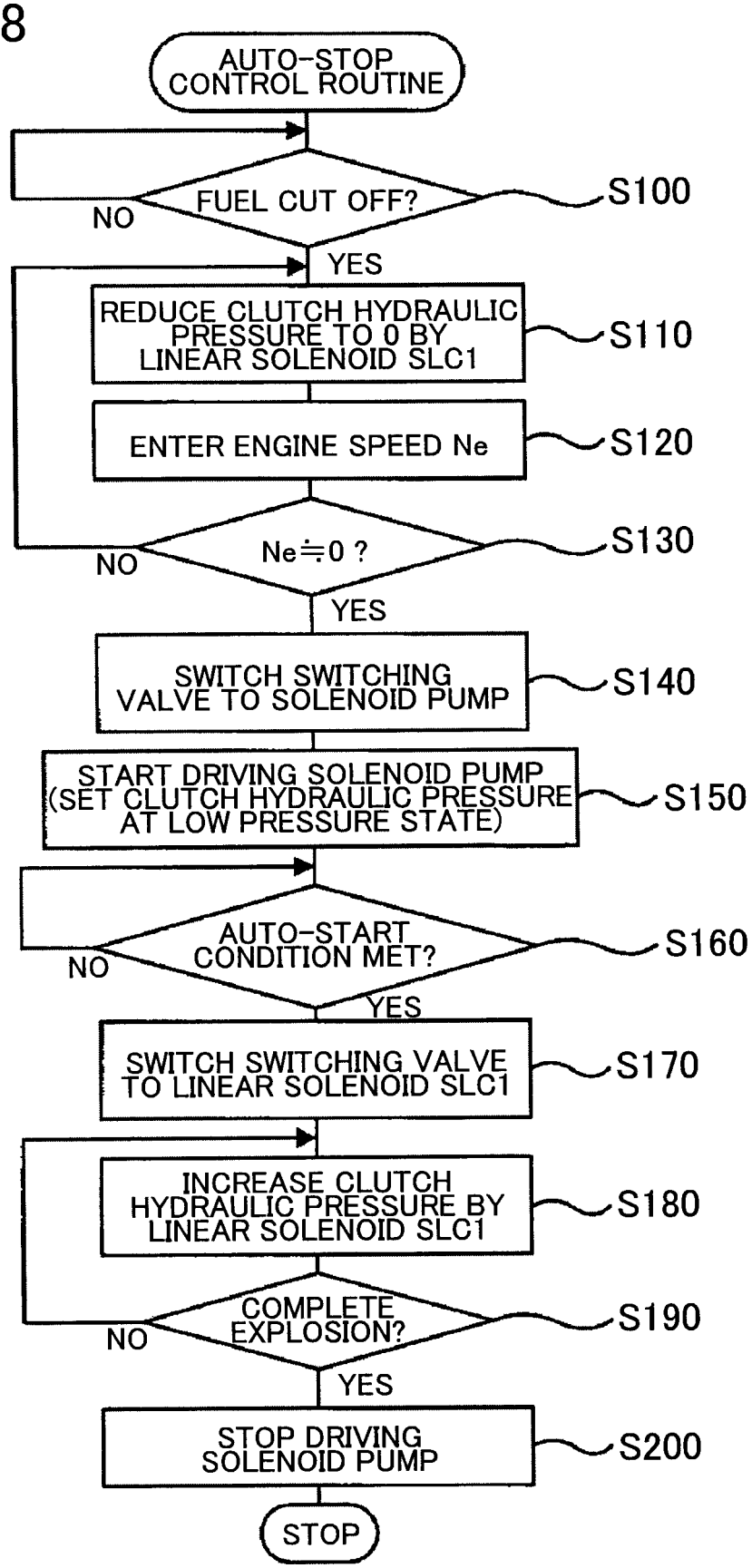
FIG. 8 is a flowchart showing an example of an auto-stop control routine.

Next, the operation of the drive unit for the automatic transmission installed in the motor vehicle 120 thus structured, particularly the operation while the engine 122 is being automatically stopped, will be described. The drive unit for the automatic transmission corresponds to the hydraulic circuit 140 and the ATECU 139. FIG. 8 is a flowchart showing an example of an auto-stop control routine carried out by the ATECU 139. This routine is carried out, while running with the shift lever 161 at the D position, when the auto-stop condition for the engine 122 is met. In this running condition, the signal pressure is output from the on/off solenoid 149, and the switching valve 148 is placed in the state where the flow passage formed between the pump section 60 of the solenoid valve 20 and the clutch C1 is blocked and the flow passage formed between the linear solenoid SLC1 and the clutch C1 is connected.

When the auto-stop control routine is carried out, since the fuel supplied to the engine 122 is cut off as the auto-stop condition for the engine 122 is met (step S100), the CPU of the ATECU 139 first controls the linear solenoid SLC1 to gradually reduce the hydraulic pressure acting on the clutch C1 down to the value of 0 (step S110) and waits for the engine speed Ne of the engine 122 comes close to the value of 0, i.e., stopping of the rotation of the engine 122 (steps S120 and S130). Note that the engine speed Ne of the engine 122 which is detected by the engine speed sensor 125 is to be input from the engine ECU 124 via the main ECU 150.

When the rotation of the engine 122 is stopped, the on/off solenoid 149 is drive controlled so that the switching valve 148 connects the flow passage formed between the pump section 60 of the solenoid valve 20 of the present embodiment and the clutch C1 and blocks off the flow passage formed between the linear solenoid SLC1 and the clutch C1 (step S140), and the driving of the pump section 60 of the solenoid valve 20 is started (step S150), waiting for the auto-start condition to be subsequently met (step S160). While the pumping power of the pump section 60 of the solenoid valve 20 is less powerful comparing to an electric oil pump driven by an electric motor, in the present embodiment, it has been designed to have a pumping power sufficient enough to stroke a clutch piston under a low pressure condition having a slightly larger torque capacity than a cranking torque by the starter motor 123 to the engine 122 and to hold that state, although the clutch C1 is not fully engaged.

When the auto-start condition for the engine 122 is met, as the engine 122 is cranked up by the starter motor 123, the on/off solenoid 149 is drive controlled so that the switching valve 148 blocks the flow passage formed between the pump section 60 of the solenoid valve 20 and the clutch C1 and connects the flow passage formed between the linear solenoid SLC1 and the clutch C1 (step S170), the linear solenoid SLC1 is drive controlled so as to increase the hydraulic pressure acting on the clutch C1 (step S180), and, when the engine 122 is in complete explosion (step S190), the pump section 60 of the solenoid valve 20 is then stopped driving (step S200). This completes the auto-stop control routine. When the engine 122 is in complete explosion, the line pressure PL is generated by the mechanical oil pump 141 driven by the power from the engine 122, and the above described drain valve 100 is activated by the line pressure PL to drain the remaining hydraulic oil in the pump chamber 70 of the pump section 60 of the solenoid valve 20 of the present embodiment. Accordingly, no difficulty occurs when the solenoid valve 20 of the present embodiment is made to function as a linear solenoid valve for adjusting the clutch pressure for the clutch C2.

Figure 9:
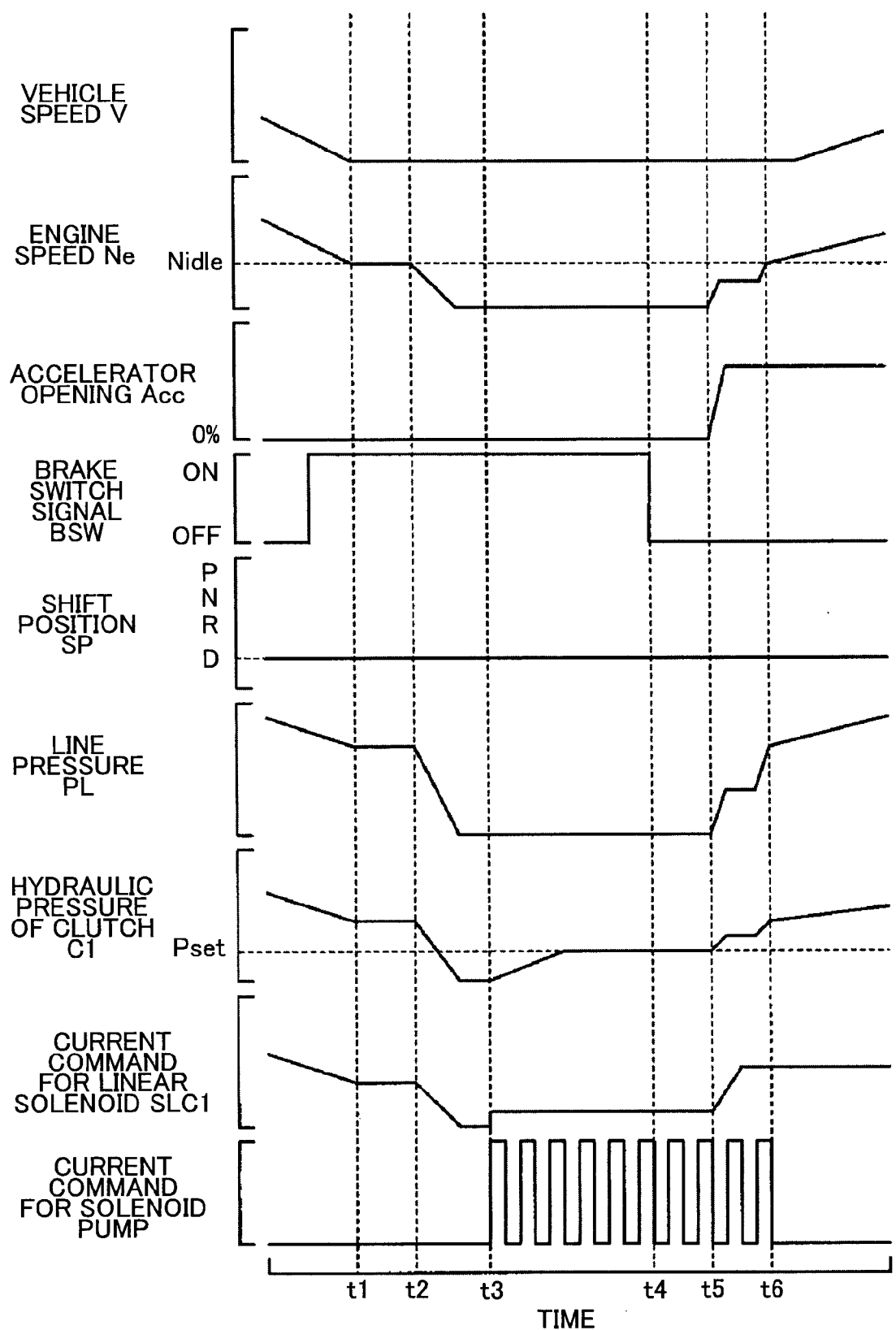
FIG. 9 is a explanatory chart showing the changes in time for a vehicle speed V, an engine speed Ne, an accelerator opening Acc, a brake switch signal BSW, a shift position SP, a line pressure PL, hydraulic pressure for a clutch C1, current command for a linear solenoid SLC1 and current command for a solenoid pump.

FIG. 9 is a explanatory chart showing the changes in time for the vehicle speed V, the engine speed Ne, the accelerator opening Acc, the brake switch signal BSW, the shift position SP, the line pressure PL, the hydraulic pressure for the clutch C1, the current command for the linear solenoid SLC1, and the current command for the solenoid pump. As shown in the chart, when the auto-stop condition for the engine 122 is met at the time t1 and the fuel supply to the engine 122 is cut off at the time t2, the linear solenoid SLC1 is driven by the current command which is set such that the hydraulic pressure acting on the clutch C1 forming the first forward speed stage is to be gradually reduced. After the rotation of the engine 122 is stopped, the flow passage formed between the pump section 60 of the solenoid valve 20 and the clutch C1 is connected by the switching valve 148 and the hydraulic pressure acting on the clutch C1 is made to be under a low pressure having a slightly larger torque capacity than a cranking torque by the pump section 60 driven by the solenoid section 30 (time t3). In this case, as the pump section 60 can pump oil directly to the clutch C1 without the linear solenoid SLC1 intervening therebetween, and the hydraulic pressure to be act on the clutch C1 can be in a low pressure state, the pump section 60 functioning as a solenoid pump does not cause the shortage of the required pumping power. When the auto-start condition for the engine 122 is then met by switching off the brake at the time t4 and by switching on the accelerator pedal at the time t5, the engine 122 is cranked up by the starter motor 123. In this case, as the hydraulic pressure of the clutch C1 is held in a low pressure state having a slightly larger torque capacity than the cranking torque, the cranking torque of the engine 122 is transferred to the driving wheels 174a and 174b as creep torque through the clutch C1. When the cranking of the engine 122 is started, the switching valve 148 connects the flow passage formed between the linear solenoid SLC1 and the clutch C1 and drives the linear solenoid SLC1 to increase the hydraulic pressure acting on the clutch C1. When the engine 122 comes to be in complete explosion, driving of the pump section 60 of the solenoid valve 20 is stopped (time t6).

According to the solenoid valve 20 of the present embodiment described in the foregoing, the pressure adjusting valve section 40, which functions as a linear solenoid valve for adjusting the clutch pressure of the clutch C2, and the pump section 60, which functions as a solenoid pump for pumping hydraulic oil to the clutch C1, are formed by the sleeve 22 and the spool 24, and the pressure adjusting valve section 40 and the pump section 60 are driven by the single solenoid section 30. Therefore, comparing to the case where a solenoid valve and a solenoid pump are separately provided, miniaturization can be achieved. Furthermore, since the suction check valve 80 is built into the sleeve 22, the suction check valve 80 can be formed in relatively high precision, thereby improving the volumetric efficiency when functioning as a solenoid pump.

The solenoid valve 20 of the present embodiment is structured as a direct control linear solenoid valve for directly controlling the clutch C2 by generating an optimal clutch pressure from the line pressure PL when functioning as a linear solenoid valve. However, the linear solenoid valve may be used as a pilot linear solenoid valve driving a separate control valve, thereby controlling the clutch C2 using the clutch pressure generated by the control valve. In addition, the clutch C1 and the brakes B1 to B4 may be similarly structured.

Figure 10:
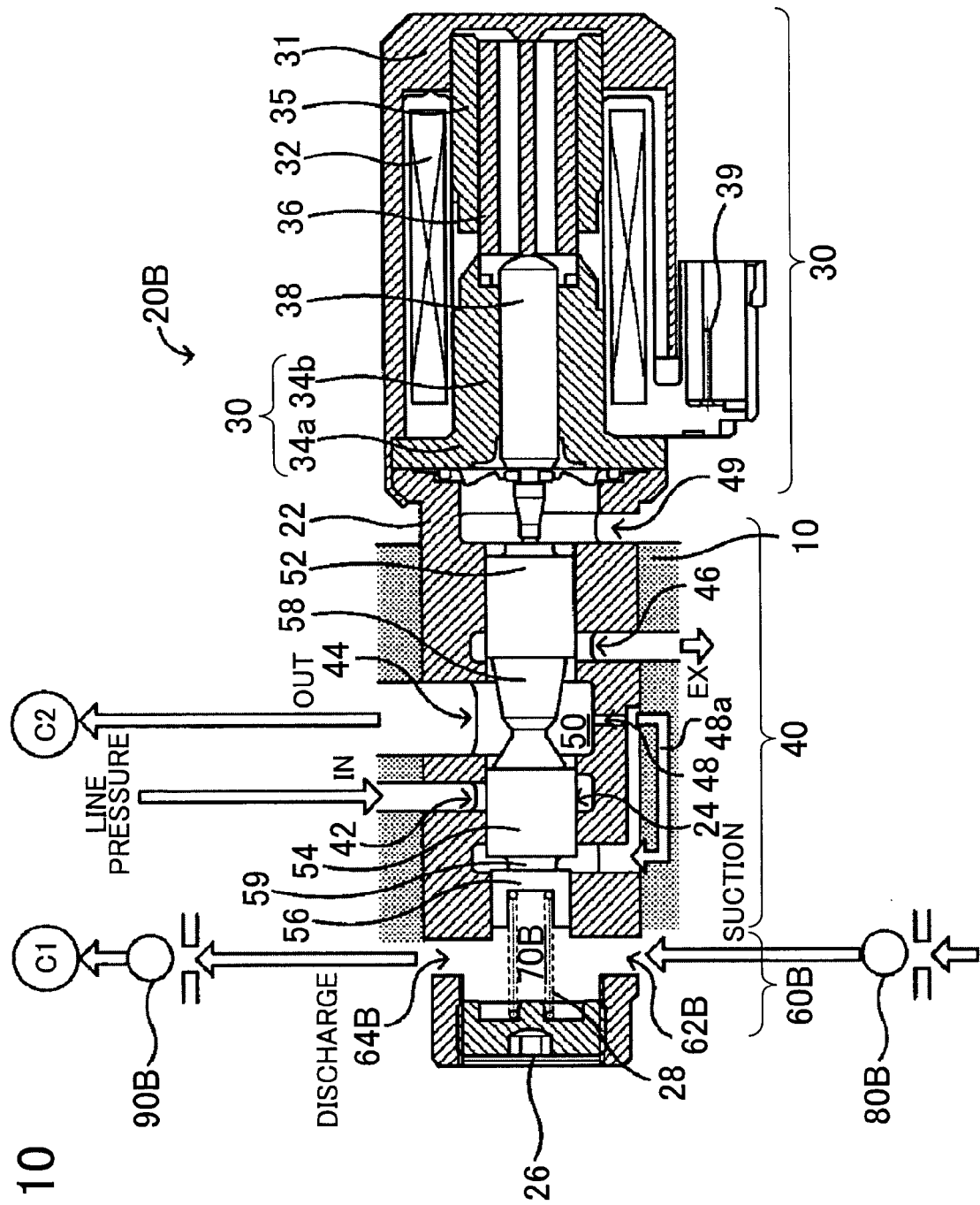
FIG. 10 is a schematic diagram showing the configuration of a solenoid valve 20B according to a modification example.

In the solenoid valve 20 of the present embodiment, the suction check valve 80 is built into the sleeve 22 and the discharge check valve 90 is incorporated in the valve body 10 external to the sleeve 22. However, as a solenoid valve 20B of a modification example shown in FIG. 10, both a suction check valve 80B and a discharge check valve 90B may be incorporated in the valve body 10 external to the sleeve 22. In the solenoid valve 20B of the modification example, the solenoid section 30 and pressure adjusting valve section 40 are structured identical to the solenoid valve 20 of the present embodiment. In the pump section 60B of the solenoid valve 20B, as shown in FIG. 10, a pump chamber 70B is formed by the sleeve 22, land 56 of the spool 24, and the end plate 26. When the coil 32 of the solenoid section 30 is de-energized from energized state, the spool 24 (land 56) is moved towards the solenoid section 30 by the biasing force of the spring 28, thereby sucking hydraulic oil from a suction port 62B into the pump chamber 70B through the suction check valve 80B incorporated in the valve body 10. When the coil 32 of the solenoid section 30 is energized from de-energized state, the spool 24 is moved towards the end plate 26 by the thrust force of the solenoid section 30, thereby discharging the sucked hydraulic oil from a discharge port 64B through the discharge check valve 90B incorporated in the valve body 10.

Figure 11:
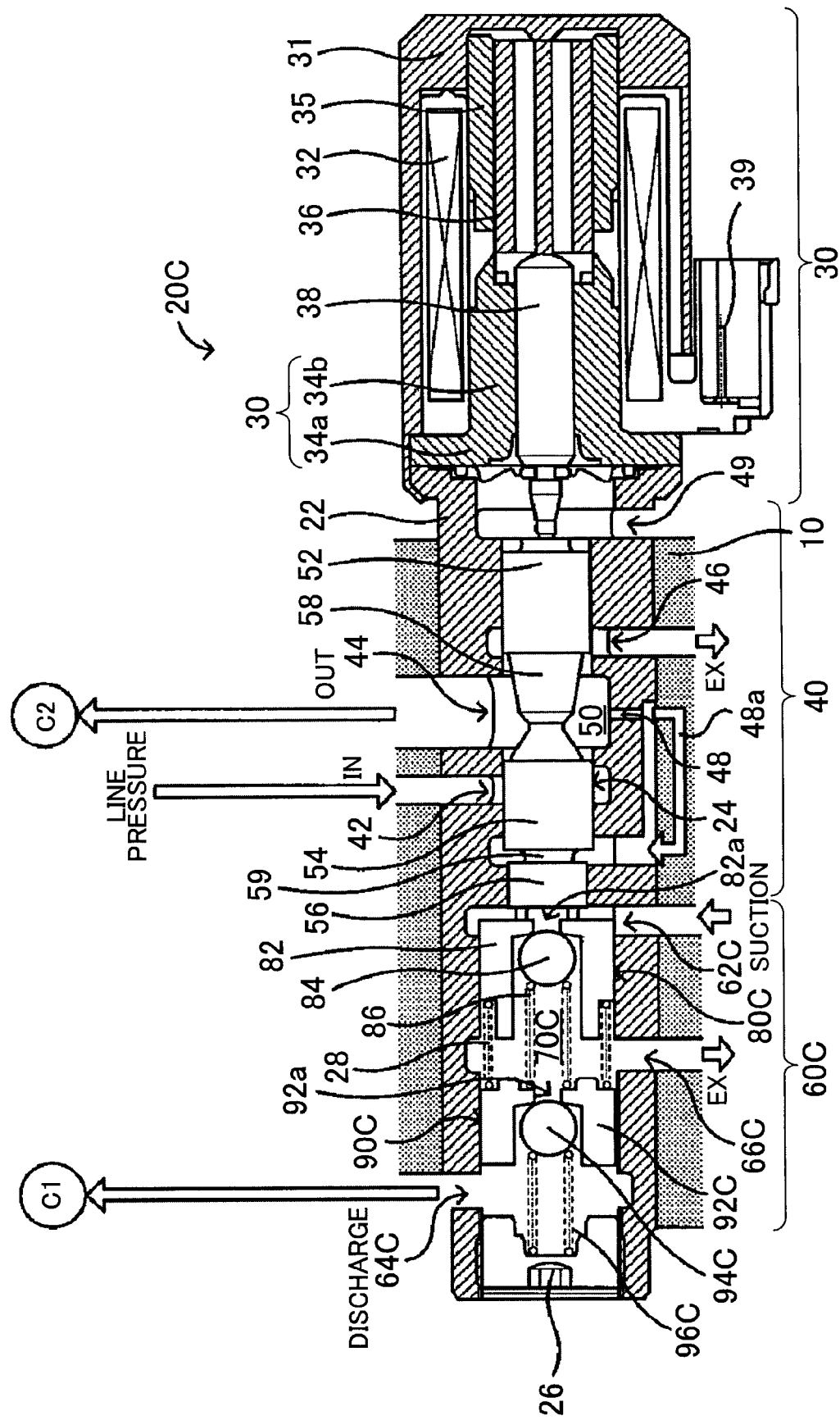
FIG. 11 is a schematic diagram showing the configuration of a solenoid valve 20C according to a modification example.

In the solenoid valve 20 of the present embodiment, the suction check valve 80 is built into the sleeve 22 and the discharge check valve 90 is incorporated in the valve body 10 external to the sleeve 22. However, as a solenoid valve 20C of a modification example shown in FIG. 11, both the suction check valve and the discharge check valve may be built into the sleeve 22. In the solenoid valve 20C of the modification example, the solenoid section 30 and the pressure adjusting valve section 40 are structured identical to the solenoid valve 20 of the present embodiment. In the pump section 60C of the solenoid valve 20C, as shown in FIG. 11, a suction check valve 80C and a discharge check valve 90C are both built into the sleeve 22, and the sleeve 22, the suction check valve 80C, and the discharge check valve 90C form a pump chamber 70C. The suction check valve 80C is structured identical to the suction check valve 80 of the solenoid valve 20 of the present embodiment. Meanwhile, the discharge check valve 90C is provided with: a cylindrical body 92C which functions as a spring holder for holding a spring 28 and a spring 86 of the suction check valve 80C and is formed with an opening 92a in the center thereof for communicating the pump chamber 70C with the discharge port 64C; a ball 94C; and a spring 96C for urging the ball 94C to be pressed against the opening 92a of the body 92C with the end plate 26 as the spring holder. The discharge check valve 90C is closed by the biasing force of the spring 96C when inside the pump chamber 70 is under a negative pressure, and is opened when inside the pump chamber 70 is under a positive pressure. Accordingly, when the coil 32 of the solenoid section 30 is de-energized from energized state, the spool 24 is moved towards the solenoid section 30 by the biasing force of the spring 96C and the spring 28, thereby sucking hydraulic oil from the suction port 62C into the pump chamber 70C through the suction check valve 80C. When the coil 32 of the solenoid section 30 is energized from de-energized state, the spool 24 is moved towards the end plate 26 by the thrust force of the solenoid section 30, thereby discharging the sucked hydraulic oil from the discharge port 64C through the discharge check valve 90C.

Further, in the solenoid valve 20 of the present embodiment, the suction check valve 80 is built into the sleeve 22 and the discharge check valve 90 is incorporated in the valve body 10 external to the sleeve 22. However, the suction check valve 80 may be incorporated in the valve body 10 external to the sleeve 22 and the discharge check valve 90 may be built into the sleeve 22.

Figure 12:
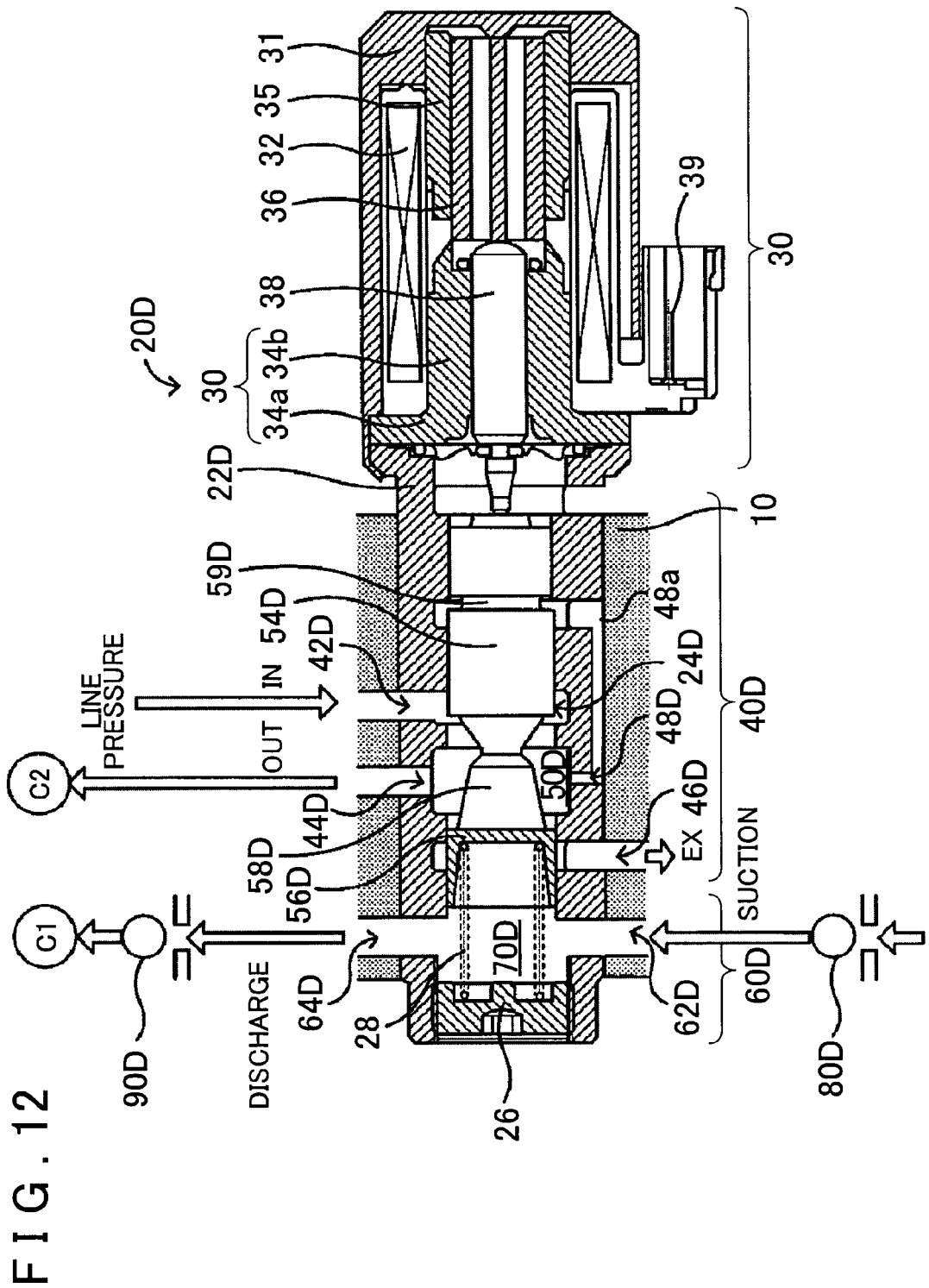
FIG. 12 is a schematic diagram showing the configuration of a solenoid valve 20D according to a modification example.

In the solenoid valve 20 of the present embodiment, a so-called normal-closed type linear solenoid valve is combined with the function of a solenoid pump. However, as a solenoid valve 20D of a modification example shown in FIG. 12, the function as a solenoid pump may be integrated into a so-called normal-open type linear solenoid valve. The solenoid section 30 is structured identical to the solenoid valve 20 of the present embodiment. In the pressure adjusting valve section 40D of the solenoid valve 20D of a modification example, when the coil 32 is de-energized, a spool 24D is moved towards the solenoid section 30 by the biasing force of the spring 28. Therefore, an input port 42D and an output port 44D formed in a sleeve 22D are placed in communication with each other through a communicating portion 58D of the spool 24D, and a drain port 46D is blocked by a land 56D of the spool 24D. Accordingly, the maximum hydraulic pressure is acted on the clutch C2. When the coil 32 is energized, the plunger 36 is attracted to the first core 34 by the attractive force corresponding to the amount of current applied to the coil 32 and the shaft 38 is then pushed out, and the spool 24D in abutment with the tip of the shaft 38 is moved towards the end plate 26. Accordingly, the input port 42D, the output port 44D, and the drain port 46D are placed in communication with one another, and a part of the hydraulic oil input from the input port 42D is output to the output port 44D and the rest of the hydraulic oil is output to the drain port 46D. Further, the hydraulic oil is supplied to a feedback chamber through a feedback port 48D, and the feedback force corresponding to the output pressure of the output port 44D is acted on the spool 24D towards the end plate 26. Consequently, the spool 24D stops at the position where the thrust force (attractive force) of the plunger 36, the spring force of the spring 28, and the feedback force just balance out. In this case, the larger the amount of current applied to the coil 32, more specifically, the larger the thrust force of the plunger 36, the more the spool 24D moves towards the end plate 26, reducing the opening area of the input port 42D and expanding the opening area of the drain port 46D. When the energization of the coil 32 is maximized, the spool 24D is moved to the position that is closest to the end plate 26 within the range of movement of the plunger 36, and thus the input port 42D is blocked by the land 54D and the output port 44D and the drain port 46D are placed in communication with each other through the communicating portion 58D. Accordingly, no hydraulic pressure is acted on the clutch C2. As described above, in the solenoid valve 20D of the modification example, when the coil 32 is not being energized, as the input port 42D and the output port 44D are placed in communication with each other while the drain port 46D is blocked, it is apparent that the solenoid valve 20D of the modification example functions as a normal-open type solenoid valve. In a pump section 60D of the solenoid valve 20D of the modification example, both a suction check valve 80D and a discharge check valve 90D are incorporated into the valve body 10 external to the sleeve 22. Further, the pump section 60D of the solenoid valve 20D is adapted such that, when the solenoid section 30 is de-energized from being energized, the spool 24D is moved towards the solenoid section 30 by the biasing force of the spring 28, making inside the pump chamber 70 under a negative pressure, thereby sucking hydraulic oil from the suction port 62D. The pump section 60D of the solenoid valve 20D is also adapted such that, when the solenoid section 30 is energized from being de-energized, the spool 24D is moved towards the end plate 26 by the thrust force of the solenoid section 30, making inside the pump chamber 70 under a positive pressure, thereby discharging the sucked hydraulic oil from the discharge port 64D. Naturally, both the suction check valve 80D and the discharge check valve 90D are not limited to be incorporated into the valve body 10 external to the sleeve 22D, and only the suction check valve 80D may be built into the sleeve 22, only the discharge check valve 90D may be built into the sleeve 22, or both the suction check valve 80D and the discharge check valve 90D may be built into the sleeve 22.

In the solenoid valve 20D of the modification example described above, the solenoid section 30 tends to become larger comparing to the case where the solenoid section 30 is applied to a normal-closed type linear solenoid valve. This is because of that, while the direction of feedback force acting on the spool 24 is in an opposite direction to the thrust force of the solenoid section 30 in a normal-closed type linear solenoid valve, the direction of feedback force acting on the spool 24 is the same as that of the thrust force of the solenoid section 30 in a normal-open type linear solenoid valve. Accordingly, as the spring load of the spring 28 needs to be large when functioning as a solenoid pump, the thrust force required for the solenoid section 30 becomes large in that respect.

Figure 13:
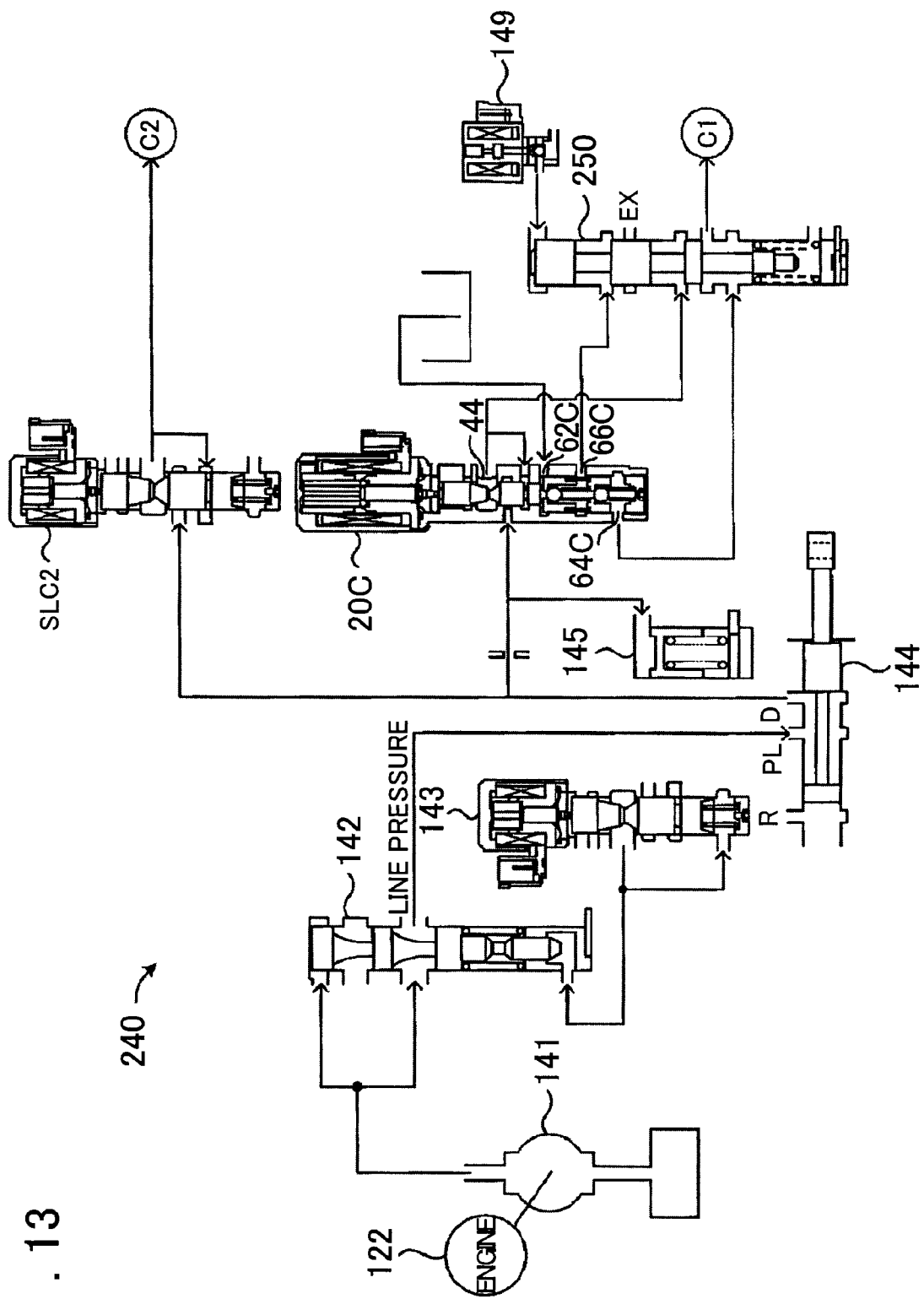
FIG. 13 is a schematic diagram showing the configuration of a hydraulic circuit 240 according to a modification example.
Figure 14A:
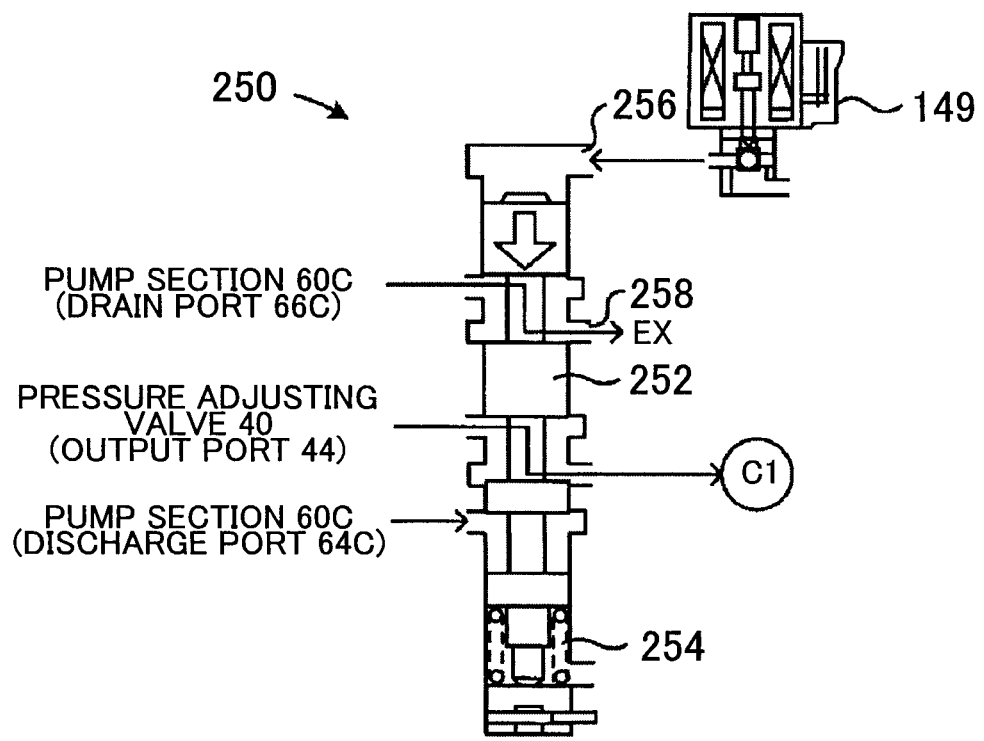
FIGS. 14A and 14B are diagrams explaining the operation of a switching valve 250.
Figure 14B:
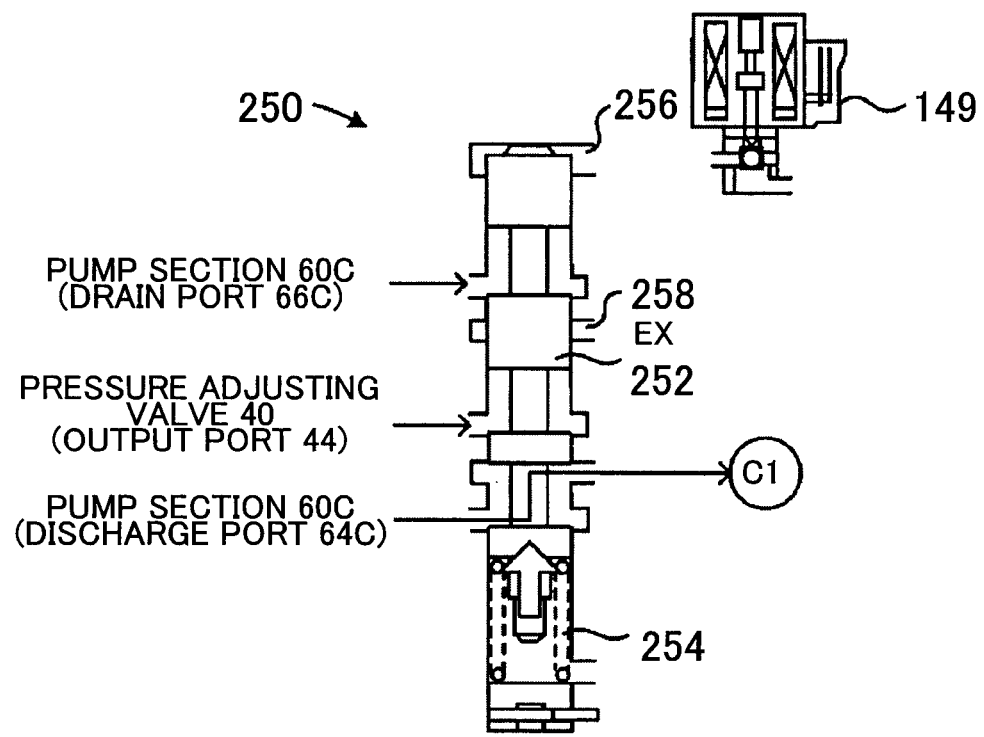

In the present embodiment, by selectively using the function as a linear solenoid and the function as a solenoid pump, the hydraulic pressure is acted on the clutch C1 for starting off when functioning as a solenoid pump and the hydraulic pressure is acted on the clutch C2 different from the clutch C1 for starting off when functioning as a solenoid pump. However, when using either one of the function as a linear solenoid valve and the function as a solenoid pump, the hydraulic pressure may be acted on the same clutch C1. FIG. 13 shows a hydraulic circuit 240 of such a modification example. In the hydraulic circuit 240 of the modification example, the same constituent elements as those of the hydraulic circuit 140 of the present embodiment will be denoted by the same reference numerals, and repeated descriptions thereof will be omitted. As shown in the drawing, the hydraulic circuit 240 of the modification example is provided, in place of the solenoid valve 20, the drain valve 100, linear solenoid SLC1, and the switching valve 148 provided in the hydraulic circuit 140 of the present embodiment, with the solenoid valve 20C of the modification example shown in FIG. 11, a linear solenoid SLC2 for inputting the line pressure PL through the manual valve 144, adjusting the line pressure PL input, and supplying the adjusted line pressure PL to the clutch C2, and a switching valve 250 for selectively switching the connections of the flow passage formed between the pressure adjusting valve section 40 of the solenoid valve 20C (output port 44) and the clutch C1 and the flow passage formed between the pump section 60C of the solenoid valve 20C (discharge port 64C) and the clutch C1, and for connecting the flow passage formed between the pressure adjusting valve section 40 of the solenoid valve 20C and the clutch C1 to drain hydraulic oil from the pump chamber 70C when the function of the pump section 60C is suspended (see FIG. 11). The switching valve 250 is provided, as shown in operational schematic diagrams in FIGS. 14A and 14B, with a spring 254 for biasing a spool 252 upward in the drawing at a lower portion of the switching valve 250 and with an input port 256 for inputting the signal pressure from the on/off solenoid 149 at an upper portion of the switching valve 250. When the signal pressure is input from the on/off solenoid 149, the signal pressure overcomes the biasing force of the spring 254 and thus the spool 252 is moved downward in the drawing, connecting the flow passage formed between the output port 44 of the pressure adjusting valve section 40 and the clutch C1, blocking the flow passage formed between the discharge port 64C of the pump section 60C and the clutch C1, and connecting the flow passage formed between the drain port 66C of the pump section 60C and a drain port 258 (refer to FIG. 14A). When the signal pressure is not input from the on/off solenoid 149, the spool 252 is moved upward in the drawing by the biasing force of the spring 254, blocking the flow passage formed between the output port 44 of the pressure adjusting valve section 40C and the clutch C1, connecting the flow passage formed between the discharge port 64C of the pump section 60C and the clutch C1, and blocking the flow passage formed between the drain port 66C of the pump section 60C and the discharge port 258 (refer to FIG. 14B). In this modification example, the solenoid valve 20C shown in FIG. 11 is used, but the present invention is not limited as such. In place of the solenoid valve 20C, the solenoid valve 20 shown in FIG. 1, the solenoid valve 20B shown in FIG. 10, or the solenoid valve 20D shown in FIG. 12 may be used.

In the present embodiment, the solenoid valve 20 is structured combining a linear solenoid for adjusting hydraulic pressure of the clutch C1 with a solenoid pump, but the present invention is not limited as such. For example, the linear solenoid 143 for driving the regulator valve 142 and a solenoid pump may be combined, or an on/off solenoid valve, in place of a linear solenoid, and a solenoid pump may be combined.

Figure 15:
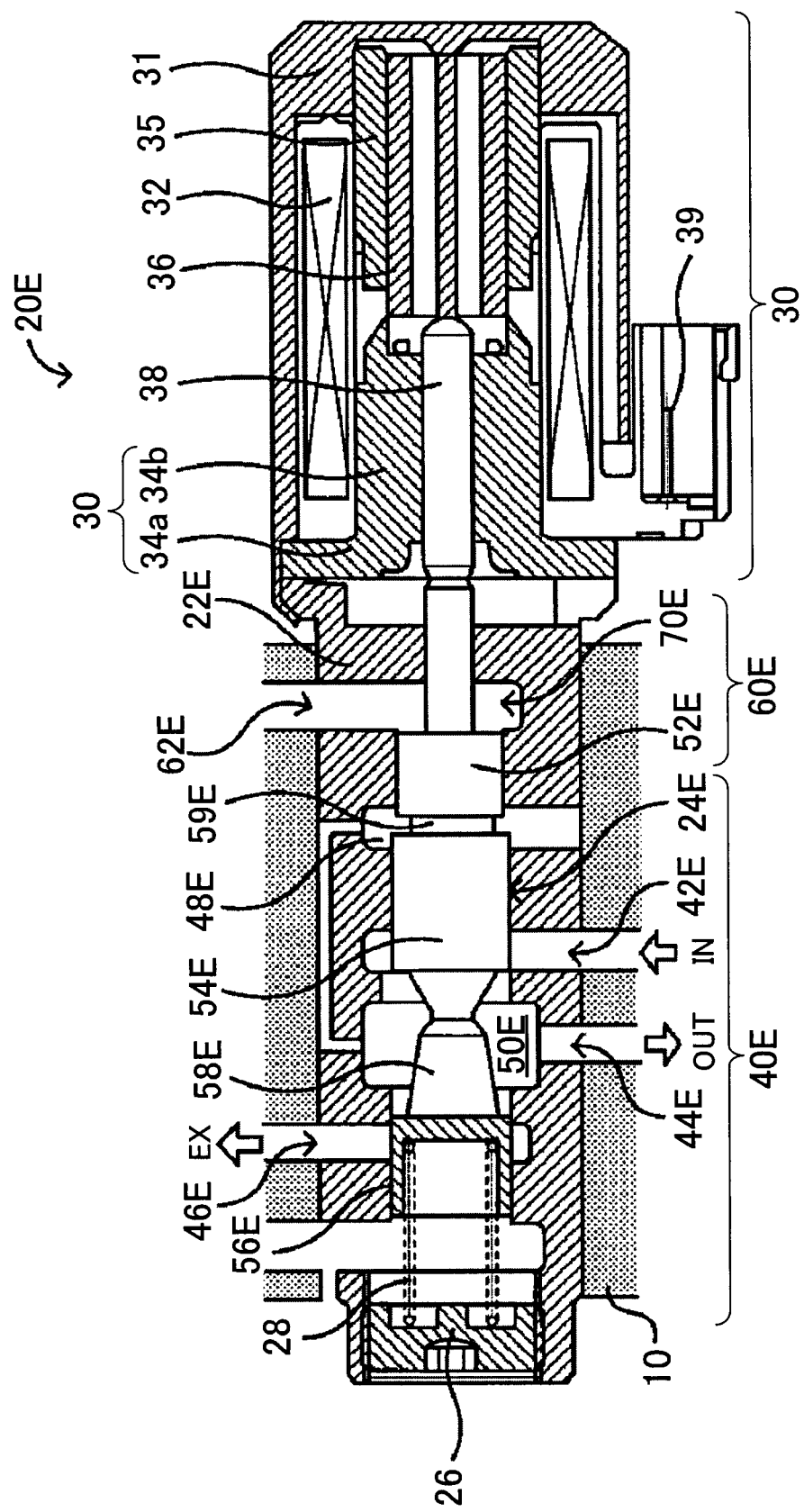
FIG. 15 is a schematic diagram showing the configuration of a solenoid valve 20E according to a modification example.

In the present embodiment, a portion of a pressure adjusting section composed of such as the sleeve 22 and the spool 24 is formed as a pump section 60, but the present invention is not limited as such, and the pressure adjusting section and the pump section 60 may be separately made. More specifically, in the solenoid valve device of the present embodiment, a pump chamber may be separately formed from a spring chamber housing the spring 28 for adjusting pressure. FIG. 15 is a schematic diagram showing the configuration of such a solenoid valve 20E of a modification example. As shown in the drawing, the solenoid valve 20E of the modification example is structured as a normal-open type linear solenoid provided with a spring chamber housing the spring 28, a pressure adjusting chamber 50E (a space connected with an input port 42E, an output port 44E, and a drain port 46E), and a feedback chamber 48E. A pump chamber 70E is formed adjacent to the feedback chamber 48E by a sleeve 22E and a land 52E of a spool 24E on the solenoid section 30 side opposite to a land 56E pressed against the spring 28. In the solenoid valve 20E, when functioning as a solenoid pump, as the coil 32 of the solenoid section 30 is energized from being de-energized, the spool 24E is moved towards the end plate 26 by the thrust force of the solenoid section 30, making inside the pump chamber 70E under a negative pressure, thereby sucking hydraulic oil into the pump chamber 70E through a suction check valve 360, which will be described later. When the coil 32 of the solenoid section 30 is de-energized from being energized, the spool 24E is moved towards the solenoid section 30 by the biasing force of the spring 28, making inside the pump chamber 70E under a positive pressure, thereby discharging the sucked hydraulic oil through a discharge check valve 370, which will be described later.

Figure 16:
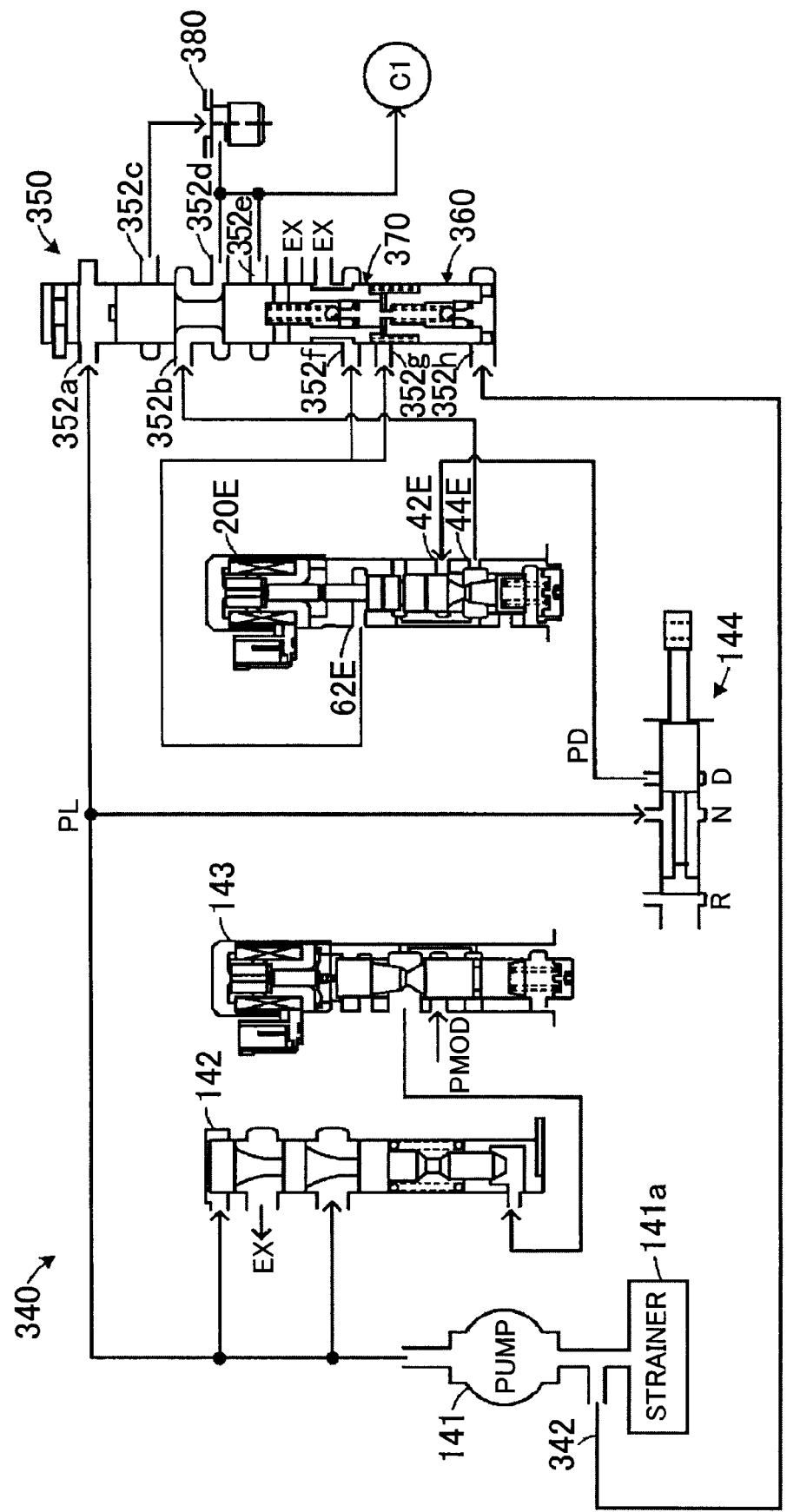
FIG. 16 is a schematic diagram showing the configuration of a hydraulic circuit 340.
Figure 17B:
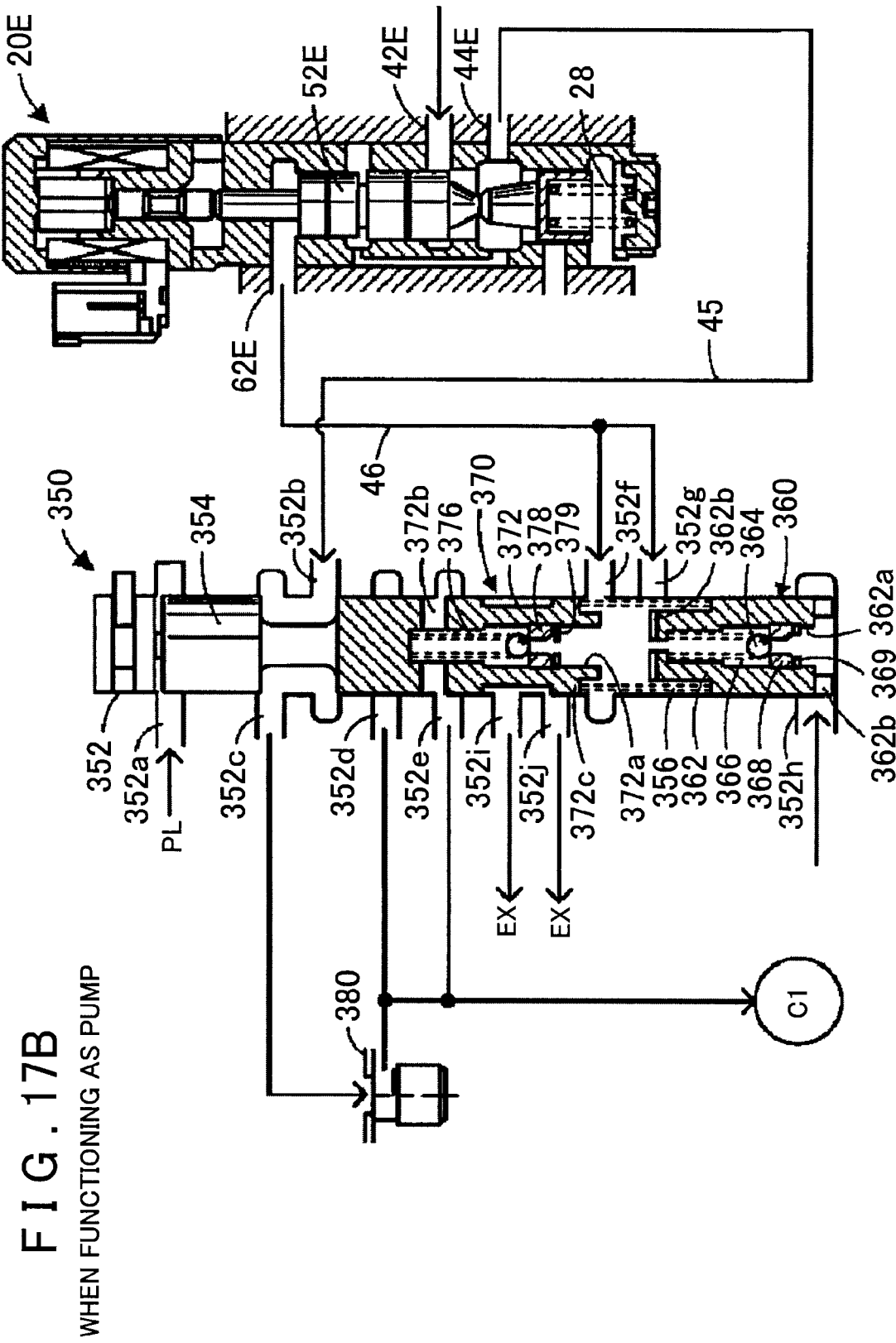

In the solenoid valve 20E of the modification example, the suction check valve 360 and the discharge check valve 370 are built into a switching valve 350. FIG. 16 is a schematic diagram showing the configuration of a hydraulic circuit 340 provided with the solenoid valve 20E and the switching valve 350, and FIGS. 17A and 17B are diagrams explaining the operation of the switching valve 350. The switching valve 350 is structured, as shown in the drawings, with a sleeve 352 formed with: a signal pressure input port 352a for inputting the line pressure as a signal pressure; an input port 352b connected to an output port 44E of the solenoid valve 20E; an output port 352c connected to the clutch C1 through a check valve 380; two output ports 352d and 352e connected to the clutch C1 without intervening the check valve 380; an input port 352f and an output port 352g connected to a pump chamber port 62E of the pump chamber 70E of the solenoid valve 20E; an input port 352h connected to a suction hydraulic passage 342 formed between a mechanical oil pump 141 and a strainer 141a; and two drain ports 352i and 352j. The switching valve 350 is also structured with a spool 354 that is slidable inside the sleeve 352 and in which the discharge check valve 370 is integrally formed, and a spring 356 for axially biasing the spool 354, and the suction check valve 360 built into the sleeve 352.

The suction check valve 360 is structured with: a hollow cylindrical body 362 formed with a central hole 362a in the axial center thereof in which a step is formed between a large diameter portion and a small diameter portion of the central hole 362a; a spring 366 inserted in the central hole 362a from the large diameter side with the step in the central hole 362a as a spring holder; a ball 364 inserted in the central hole 362a from the large diameter side after inserting the spring 366; a hollow cylindrical ball holder 368 inserted in the central hole 362a for holding the ball 364; and a snap ring 369 for fixing the ball holder 368 to the body 362. Meanwhile, the discharge check valve 370 is structured with: a body 372 that is integrally formed with the spool 354 and formed with a recessed central hole 372a in the axial center thereof and a through hole 372b penetrating the central hole 372a in a radial direction thereof; a spring 376 inserted in the central hole 372a with a bottom of the central hole 372a as a spring holder; a ball 374 inserted in the central hole 372a after inserting the spring 376; a hollow cylindrical ball holder 378 inserted in the central hole 372a for holding the ball 374; and a snap ring 379 for fixing the ball holder 378 to the body 372. Further, in the body 372 of the discharge check valve 370, a narrow diameter portion 372c, which is a portion where the outer diameter of the body 372 is made smaller, is formed.

In the switching valve 350 thus structured, as shown in FIG. 17A, when the line pressure PL is being applied to the signal pressure input port 352a, the spool 354 is moved downward in the drawing as the spring 356 compresses by the line pressure PL, making the input port 352b communicate with the output port 352d and making the input port 352f communicate with the drain port 352j through the narrow diameter portion 372c. By making the solenoid valve 20E function as a pressure adjusting valve, the hydraulic pressure from the output port 44E can be acted on the clutch C1. In this case, as the hydraulic oil remaining in the pump chamber 70E and the flow passage connected to the pump chamber 70E is drained through the input port 352f, the narrow diameter portion 372c, and the drain port 352j in that order, the accuracy of pressure adjustment of the solenoid valve 20E is not adversely affected. Further, a through hole 362b is formed in the body 362 of the suction check valve 360 at a position where the body 362 of the suction check valve 360 abuts on the body 372 of the discharge check valve 370, and therefore the hydraulic oil remaining in a space between the suction check valve 360 and the discharge check valve 370 is also drained through the output port 352g, the input port 352f, the narrow diameter portion 372c, and the drain port 352j in that order. Furthermore, as shown in FIG. 17B, when the line pressure PL is not input to the signal pressure input port 352a, the spool 354 is moved upward in the drawing as the spring 356 extends by the biasing force of the spring 356, blocking the communication of the input port 352b with the output port 352d, making the input port 352h communicate with the output port 352g through the suction check valve 360 (central hole 362a), making the input port 352f communicate with the output port 352e through the discharge check valve 370 (central hole 372a and through hole 372b), and blocking the communication of the input port 352f with the drain ports 352i and 352j. By making the solenoid valve 20E function as a solenoid pump, the hydraulic oil can be sucked into the pump chamber 70E through the input port 352h of the switching valve 350, the suction check valve 360, and the output port 352g in that order, and the hydraulic oil sucked can be supplied to the clutch C1 through the input port 352f, the discharge check valve 370, and the output port 352e in that order.

As described above, when functioning as a pressure adjusting valve, the hydraulic oil in the pump chamber 70E or the flow passage connected thereto is drained into air, if the air enters therein when subsequently functioning as a pump, the hydraulic oil cannot be sufficiently pressurized and the pump performance may deteriorate. In the solenoid valve 20E of the modification example, the pump chamber 70E is formed adjacent to the feedback chamber 48E, and therefore, when functioning as a pressure adjusting valve, inside the feedback chamber 48E is under a high pressure and thus the hydraulic oil leaks out from the feedback chamber 48E to the pump chamber 70E. This leak of hydraulic oil is used to generate the flow of hydraulic oil from the pump chamber 70E towards the drain, and the air entered is also drained together with the hydraulic oil. Consequently, when the solenoid valve 20E is switched from the state where the solenoid valve 20E functions as a pressure adjusting valve to the state where the solenoid valve 20E functions as a solenoid pump, the performance of the pump can be promptly exercised.

In the present embodiment, it has been described that the solenoid valve 20 is incorporated in the drive unit of the automatic transmission. However, the present invention is not limited as such. The solenoid valve 20 may be applied to any device in which a solenoid valve is combined with a solenoid pump.

Here, the correspondence relation of the major elements of the present embodiment with respect to the major elements of the present invention described in Disclosure of the Invention will be described. In the present embodiment, the solenoid section 30 corresponds to the "solenoid section", the pressure adjusting valve section 40 and the pump section 60 correspond to the "pressure adjusting section", and the pump section 60, the suction check valve 80, and the discharge check valve 90 correspond to the "pump section". Further, the suction check valve 80 and the discharge check valve 90 correspond to the "suction/discharge mechanism". The spool 24 and 24E correspond to the "valve element". Furthermore, the automatic transmission 130 corresponds to the "automatic transmission", and the hydraulic circuit 140 and the ATECU 139 correspond to the "drive unit". Since the correspondence relation of the major elements of the present embodiment with respect to the major elements of the present invention described in Summary of the Invention is an example for explaining the embodiment of the present invention and is not intended to limit in any way the elements of the invention described in Summary of the Invention. More specifically, the present invention described in Summary of the Invention should be interpreted based on the description thereof, and the embodiment of the present invention is merely a specific example of the present invention described in the Summary of the Invention.

While the preferred embodiment of the present invention is described in details above, the present invention is not limited to the specific embodiment, and the present invention may be embodied in various modifications without departing from the spirit and scope of the present invention.

INDUSTRIAL APPLICABILITY

The present invention can be utilized in automotive industry.

The invention claimed is:
1. A hydraulic controlling device, comprising:
a mechanical oil pump for pumping oil using power from an engine;
a solenoid valve comprising:
a pressure adjusting valve that adjusts fluid pressure supplied from the mechanical oil pump;
a pump section that sucks and discharges working fluid; and
a single solenoid section that drives the pressure adjusting valve and the pump section;
a suction check valve that allows the working fluid to flow to a pump chamber in the pump section;
a discharge check valve that allows the working fluid to flow from the pump chamber to an operation target; and
a switching device for switching between a first state in which the working fluid in the pump chamber in the pump section is drained and a second state in which the working fluid in the pump chamber is inhibited to be drained, wherein:
the suction check valve is closed when an inside of the pump chamber is under a positive pressure and is opened when the inside of the pump chamber is under a negative pressure, and
the discharge check valve is closed when the inside of the pump chamber is under the negative pressure and is opened when the inside of the pump chamber is under the positive pressure.
2. The hydraulic controlling device according to claim 1, the solenoid valve further comprising a valve element, wherein the pressure adjusting valve is operated by electromagnetic force of the solenoid section, and the valve element selectively operates to compress and expand the pump chamber in the pump section and to adjust the fluid pressure supplied from the mechanical oil pump.
3. The hydraulic controlling device according to claim 2, wherein
the pressure adjusting valve includes an elastic member that generates a thrust force in a direction opposite to a sliding direction of the valve element when driven by a thrust force of the solenoid section and an elastic member chamber that houses the elastic member, and
the elastic member chamber is commonly used as at least a part of the pump chamber.
4. The hydraulic controlling device according to claim 3, wherein the working fluid is sucked as the valve element slides by an elastic force of the elastic member when the thrust force of the solenoid section is released, and the working fluid sucked is discharged as the valve element slides by the thrust force generated by the solenoid section.

5. The hydraulic controlling device according to claim 3, wherein the pressure adjusting valve has a feedback port and is structured as a normal-closed type solenoid valve that is closed when the solenoid section is not being energized.

6. The hydraulic controlling device according to claim 3, wherein the suction check valve and the discharge check valve are disposed external to the pressure adjusting valve.

7. The hydraulic controlling device according to claim 3, wherein the suction check valve is built into the pressure adjusting valve.

8. The hydraulic controlling device according to claim 7, wherein the discharge check valve is built into the pressure adjusting valve.

9. The hydraulic controlling device according to claim 1, wherein the switching device has a spool being slidable in a hollow portion connected to the pump chamber through a flow passage, and is a switching valve forming the first state when the spool is at a first position and forming the second state when the spool is at a second position.

10. The hydraulic controlling device according to claim 9, wherein
the pump section is built in the pressure adjusting valve,
the pressure adjusting valve has a suction port, a discharge port, and a drain port that is connected to the hollow portion of the switching valve through the flow passage, and
the working fluid is sucked through the suction port and the working fluid sucked is discharged through the discharge port.

11. The hydraulic controlling device according to claim 1, wherein
the pressure adjusting valve is provided with a hollow sleeve in which an input port and an output port are formed, and a spool that forms a pressure adjusting chamber with the sleeve such that the fluid pressure input from the input port is adjusted and output to the output port by sliding inside the sleeve, and
the pump chamber in the pump section is formed as a space blocked from the pressure adjusting chamber.

12. The hydraulic controlling device incorporated in a drive unit that drives an automatic transmission provided with a plurality of fluid pressure servos for friction engagement elements according to claim 1, wherein
the solenoid valve device is structured to function as the pressure adjusting valve that adjusts fluid pressure acting on one of the plurality of fluid pressure servos for the friction engagement elements and to function as a solenoid pump that generates fluid pressure acting on the other one of the plurality of fluid pressure servos for the friction engagement elements.

13. The hydraulic controlling device incorporated in a drive unit that drives an automatic transmission provided with a plurality of fluid pressure servos for friction engagement elements according to claim 1, wherein
the solenoid valve device is structured to function as the pressure adjusting valve that adjusts fluid pressure acting on one of the plurality of fluid pressure servos for the friction engagement elements and to function as a solenoid pump that generates fluid pressure acting on the one of the plurality of fluid pressure servos for the friction engagement elements.

14. The hydraulic controlling device according to claim 1, wherein the pressure adjusting valve adjusts the fluid pressure supplied from the mechanical oil pump and outputs the adjusted fluid pressure to a fluid pressure servo for a friction engagement element of an automatic transmission.

15. The hydraulic controlling device according to claim 1, wherein the switching device is directly connected to the pump chamber.

16. The hydraulic controlling device according to claim 1, wherein the switching device is switched to the first state when the pressure adjusting valve adjusts the fluid pressure supplied from the mechanical oil pump.

* * * * *